United States Patent [19]

Tsutsumi et al.

[11] Patent Number: 5,131,071
[45] Date of Patent: Jul. 14, 1992

[54] FUZZY INFERENCE APPARATUS

[75] Inventors: Yasuhiro Tsutsumi; Junichi Nishimura, both of Takatsuki, Japan

[73] Assignee: Omron Tateisi Electronics Co., Kyoto, Japan

[21] Appl. No.: 410,462

[22] Filed: Sep. 21, 1989

[30] Foreign Application Priority Data

| Sep. 26, 1988 | [JP] | Japan | 63-240542 |
| Sep. 27, 1988 | [JP] | Japan | 63-239736 |
| Sep. 27, 1988 | [JP] | Japan | 63-239737 |
| Sep. 29, 1988 | [JP] | Japan | 63-244969 |
| Sep. 30, 1988 | [JP] | Japan | 63-244622 |
| Sep. 30, 1988 | [JP] | Japan | 63-247109 |
| Sep. 30, 1988 | [JP] | Japan | 63-247110 |

[51] Int. Cl.⁵ .............................. G06G 7/00
[52] U.S. Cl. ........................ 395/3; 395/900
[58] Field of Search ......................... 364/513

[56] References Cited

FOREIGN PATENT DOCUMENTS

| 0268182 | 5/1988 | European Pat. Off. |
| 63-113733 | 5/1988 | Japan |
| 63-113734 | 5/1988 | Japan |
| 63-113736 | 5/1988 | Japan |
| 63-123124 | 5/1988 | Japan |
| 63-123137 | 5/1988 | Japan |
| 63-123177 | 5/1988 | Japan |

OTHER PUBLICATIONS

Edwards, Jon, "Atari 800 XL: A New Look for an Old Friend", *Byte*, Mar. 1985, pp. 267-273.
Nikkei Electronics Jul. 27, 1987 (No. 426) pp. 129-152.

Primary Examiner—Allen R. MacDonald
Assistant Examiner—Robert W. Downs
Attorney, Agent, or Firm—Dickstein, Shapiro & Morin

[57] ABSTRACT

A fuzzy inference engine has a plurality of individual inference sections (10) and a concluder section (110) for integrally processing outputs from the inference sections. In order for the inference sections to share membership function circuits and membership function generator circuits, these circuits are arranged in arrays disposed at location external with respect to the inference sections, which selectively use outputs from membership function circuit arrays (11, 12, 13) and the membership function generate circuit array (15).

11 Claims, 20 Drawing Sheets

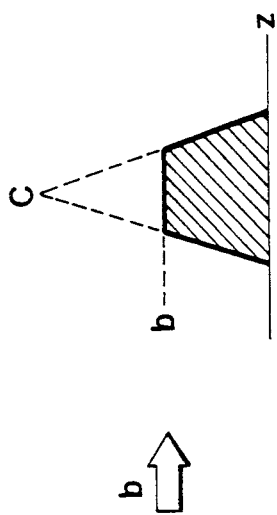
Fig. 2 PRIOR ART
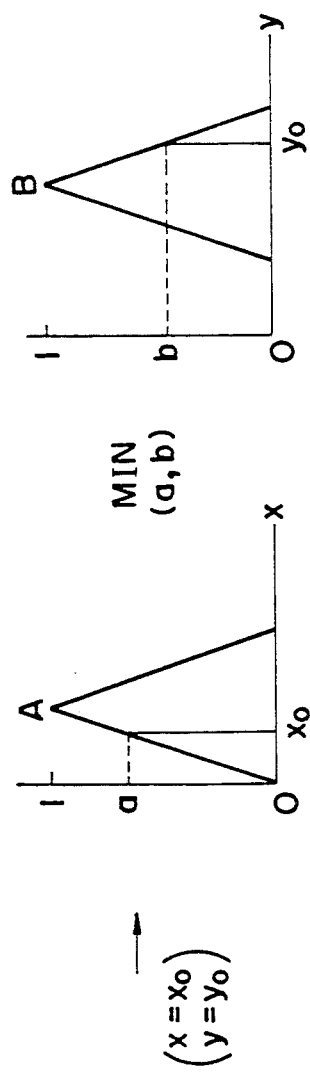
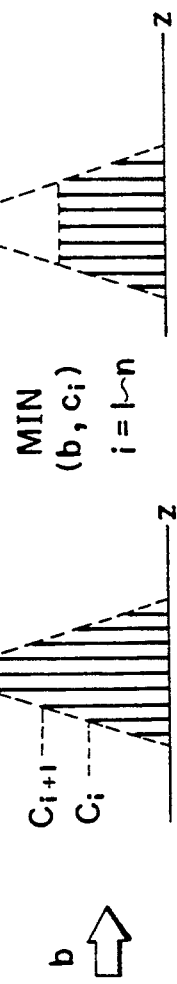
Fig. 3 PRIOR ART

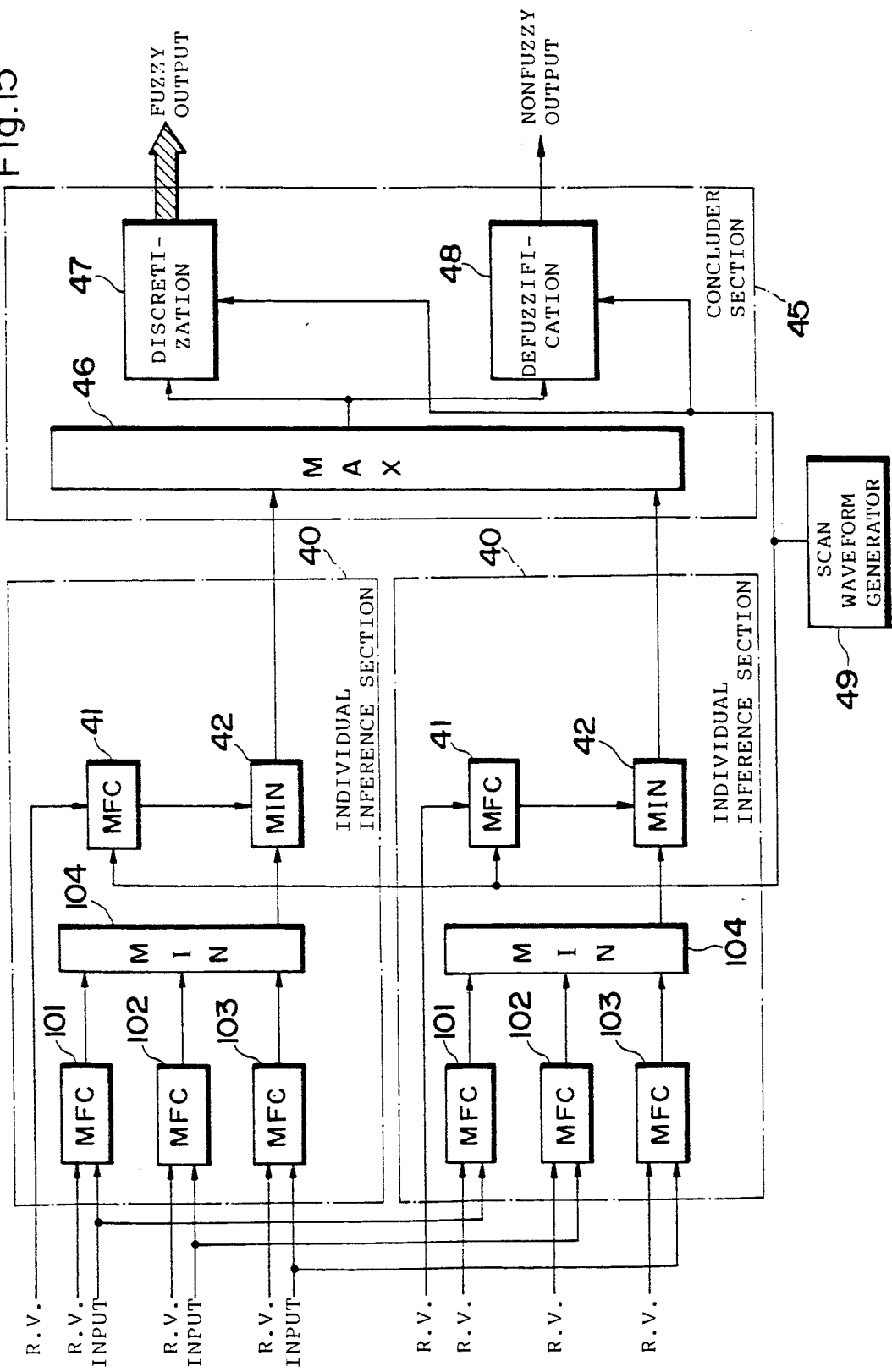

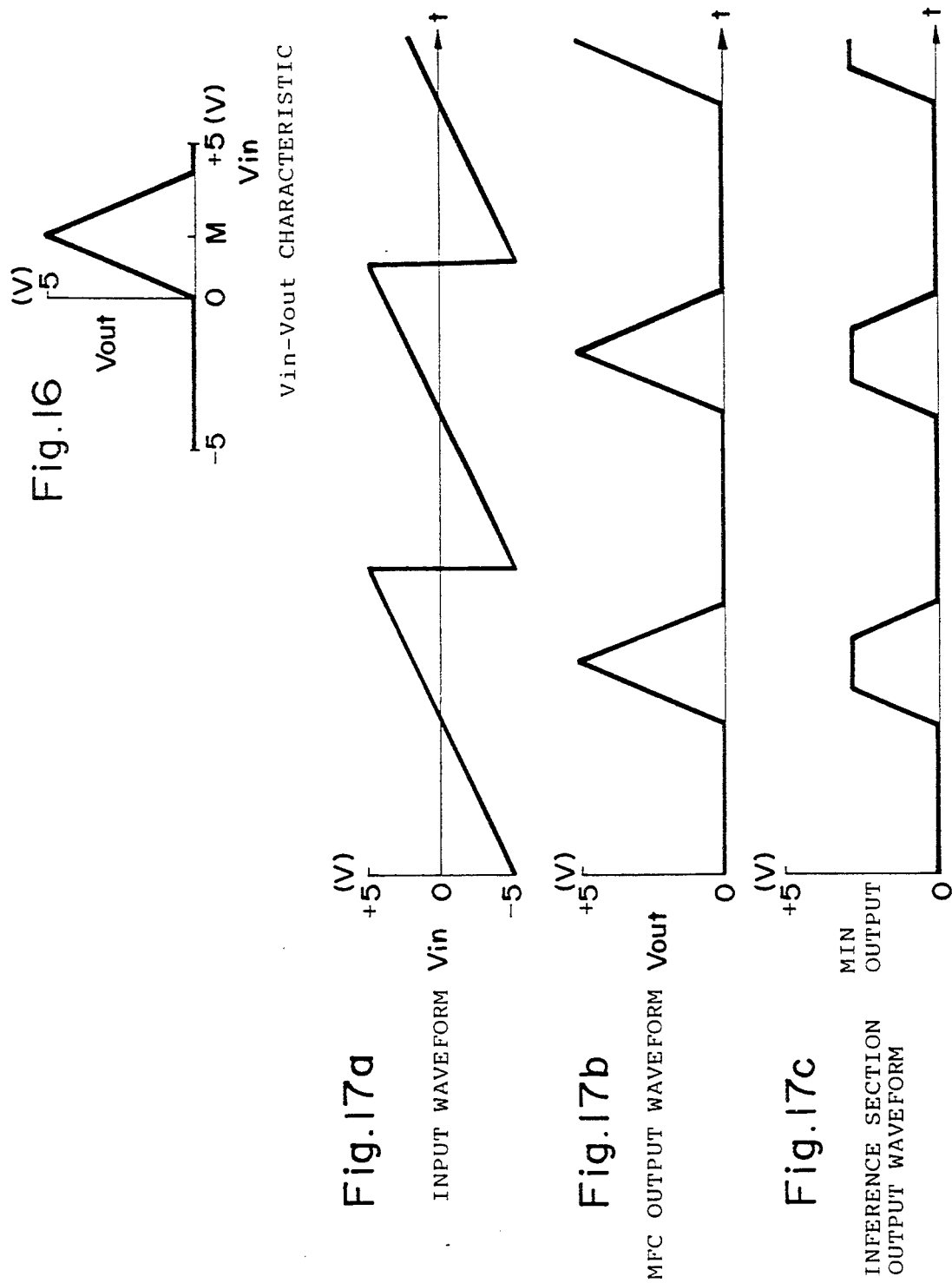

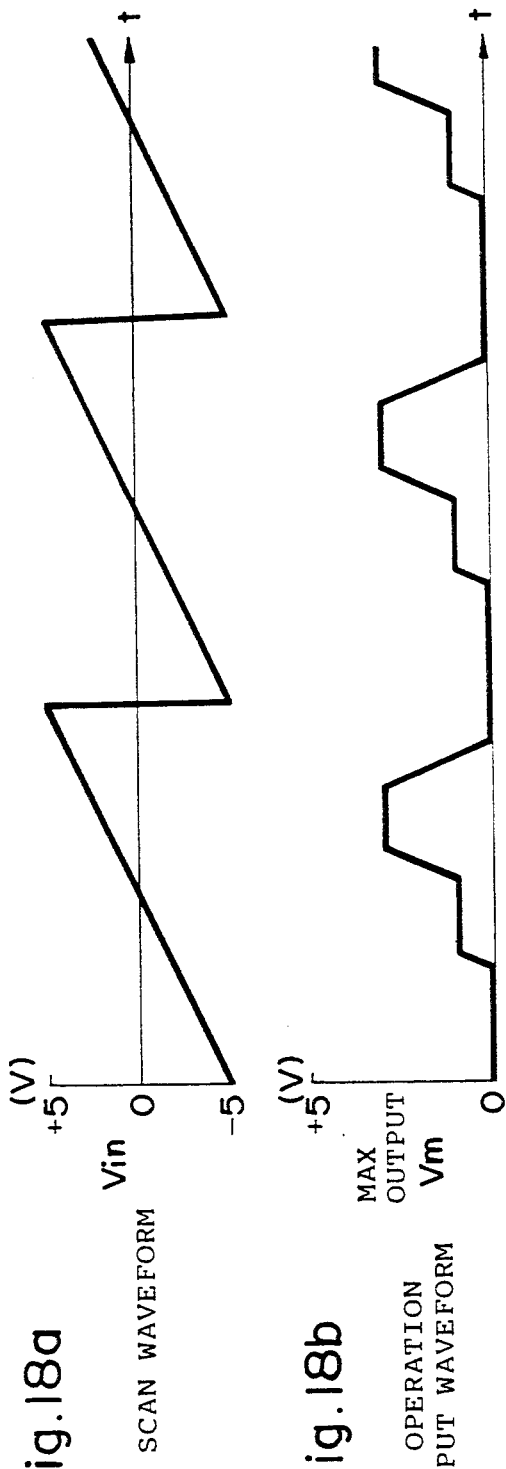
Fig.18a SCAN WAVEFORM
Fig.18b MAX OPERATION OUTPUT WAVEFORM
Fig.18c WAVEFORM OF DIVIDEND

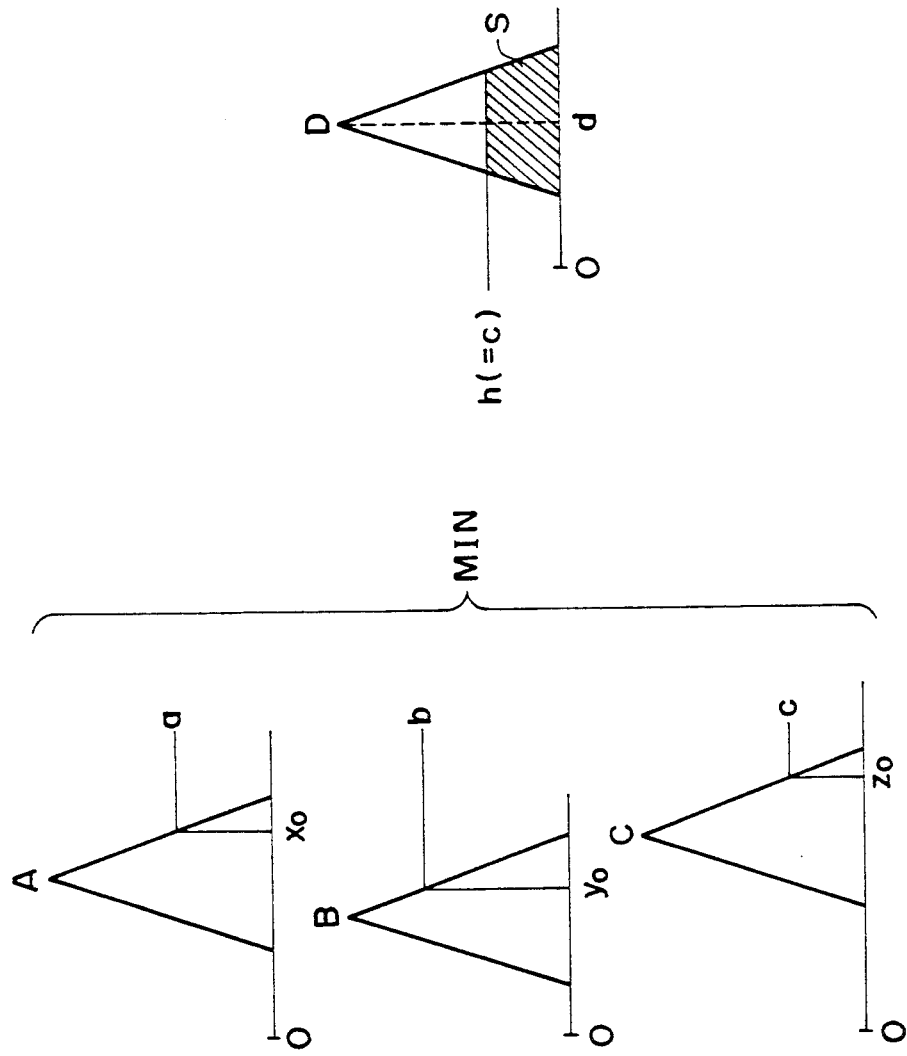

FUZZY INFERENCE APPARATUS

BACKGROUND OF THE INVENTION

Field of the Invention

The present invention relates to a fuzzy inference apparatus for conducting a fuzzy inference and to a function generating unit to be employed, for example, in a membership function circuit or a membership function generator of a fuzzy inference apparatus.

Description of the Prior Art

A fuzzy inference is achieved in accordance with rules in the form of If . . . then . . . (modus ponens). The rule is represented in a format "If x is A and y is B and z is C, then w is D."

In this representation, x, y, and z are input variables of an antecedent, A, B, and C are membership functions thereof, w is a variable of a consequent, and D is a membership function thereof.

In the example above, the antecedent includes three kinds of input variables. In a case of two kinds thereof, the rule is expressed as follows.

"If x is A and y is B, then z is C." Namely, x and y are input variables of an antecedent, A and B are membership functions thereof, z is a variable of a consequent, and C is a membership function thereof in this representation.

The membership functions such as A to D are represented, for example, with linguistic information associated with PL, PM, PS, ZR, NS, NM, NL, etc. In these information items, P, N, L, M, and S denote positive, negative, large, medium, and small, respectively. In consequence, expressions PL and NS stand for positive large and negative small, respectively. ZR indicates almost zero. The linguistic information may be expressed, for example, with binary codes each comprising a plurality of bits.

FIG. 1 shows a conventional fuzzy inference apparatus, which includes a plurality (associated with a number of rules to be established) of individual inference sections or engines 100 and an integrator section 110 connected thereto. Each inference section 100 comprises membership function circuits (to be abbreviated as MFC herebelow) 101, 102, and 103 each being supplied with an input variable to produce a signal (e.g. a voltage signal) representing an associated value of a membership of an antecedent, a membership function generator (to be abbreviated as MFG herebelow) 105 for generating a signal representing a membership function of a consequent (e.g. a voltage signal distributed onto 25 lines, which transmit the voltage distribution and which are represented by a hatched bus in FIG. 1; reference is to be made to the U.S. patent application Ser. No. 07/116,777 and the European Patent Application No. 87 116 529.6.), a logic intersection circuit 104 for conducting a MIN operation on outputs from the MFCs 101 to 103, and a logic union circuit 106 for computing a MIN operation on outputs from the logic intersection circuit 104 and the MFG 105. Each of the MFCs 101 to 103 is supplied with a reference voltage (to be abbreviated as R.V. in drawings) corresponding to linguistic information (to be abbreviated as L.I. in drawings), so as to be set to produce a membership function conforming to a rule. Moreover, other parameters of the membership function outputted from the MFC is set by use of a parameter setting unit not shown. The reference voltage defines a peak position (center position) of the membership function. In this configuration, the MFG 105 is supplied with a code representing linguistic information to produce a membership function associated with the linguistic information. The concluder section 110 includes a logic union circuit 111 for achieving an MAX operation on the membership functions produced from the inference sections 100 and a defuzzifier 112 for defuzzifying an output from the logic union circuit 111 to produce a determinant output. The logic union circuit 111 produces a fuzzy output.

As described above, the conventional fuzzy inference apparatus is provided with an MFC and an MFG for each rule (i.e. for each individual inference section 100). Even a membership function represented with the same linguistic information is required to be set each time the function is assigned to a rule. In consequence, there arise problems that an error occurs in the setting operation and that the setting operation requires a long period of time.

Furthermore, when using such a conventional fuzzy inference apparatus, in a case where two or more inference systems are provided and the membership functions vary between the respective inference systems, it is necessary to prepare the fuzzy inference apparatuses as there are inference systems.

Referring now to FIG. 2, a description will be given of the fuzzy inference process in the individual inference section in a case of two input variables.

The MFCs 101 and 102 are respectively supplied with inputs $x_o$ and $y_o$ such that outputs a and b therefrom are fed to the logical intersection circuit 104. This circuit 104 selects the smaller of the inputs, namely, the output b in this case, so as to output the signal b therefrom. On the other hand, the MFG 105 produces the membership function C. The function C and the output b from the circuit 104 are subjected to an MIN operation in the logic union circuit 106.

As described above, since the MFG 105 outputs a voltage signal which is distributed on a plurality of signal lines to represent a predetermined membership function, the output signal from the MFG 105 is expressed as a set of voltage $C_i$ ($i = 1$ to n) as shown in FIG. 3. In consequence, the results from the MIN operation are also represented as a set of voltage signals distributed on n signal lines and develop values in a discrete form.

Since the MFG 105 outputs a signal distribution on a plurality of signal lines, such plural signal lines are required not only in each inference section 100 but also in the determinant or concluder section 110, which increases the size of the circuit and causes the circuit configuration to be complex. Since the membership function is expressed as a set of signals in a discrete form, there arises also a problem that the shape of the function is restricted by the number of signal lines.

Incidentally, in a fuzzy inference apparatus, a membership function circuit and a membership function generator circuit are necessary as described above. In a case where the membership function circuit or the membership function generator circuit is implemented in a digital circuit, there are in general employed a memory method in which a function value (an output value) is stored in a predetermined location to be accessed by use of a variable value (an input value) as an address thereof or a method in which a form or format of a function formula is registered such that an input value is assigned thereto so as to produce an output value.

However, in the memory method above, in order to improve the precision of the function value to be produced, the interval between variables as addresses is required to be minimized, which leads to a disadvantage that a large memory and a considerable manual operation are necessary for setting the membership function. Moreover, in a case of a membership function representing senses of a human, it is difficult to establish quite complicated items for the senses at the setting phase, and such items do not develop so significant functions.

In the latter case of the method above, since the membership function value is to be computed by a software program, there has been a problem that a long period of time is required.

SUMMARY OF THE INVENTION

It is therefore an object of the present invention to provide a fuzzy inference apparatus which facilitates setting and adjustment of the MFC and MFG.

Another object of the present invention is to provide a fuzzy inference apparatus which can be applied also to two or more inference systems.

Still another object of the present invention is to provide a fuzzy inference apparatus which has a simplified constitution and in which a membership function is represented with consecutive values.

Another object of the present invention is to provide a small-sized fuzzy inference apparatus which can operate at a high speed.

Still another object of the present invention is to provide a fuzzy inference apparatus having a high performance in which a degree of significance of a rule can be changed and the shape of a membership function can be altered depending on linguistic information.

Another object of the present invention is to provide a fuzzy inference apparatus in which the adjustment is facilitated by replacing a membership function generator circuit.

Still another object of the present invention is to provide a function generating unit in which when a membership function is registered, the variable values to be plotted is minimized and a resolution is increased, thereby improving the inference precision.

A fuzzy inference apparatus according to the first invention includes MFC arrays of which a number is associated with a number of kinds of input variables to be processed, an MFG array, a plurality of individual inference sections or engines, and a concluder section for integrating outputs from these individual inference sections so as to produce a final inference output. Each MFC array includes a predetermined number of MFCs, whereas the MFG array includes a predetermined number of MFGs. Each individual inference section includes, a first selector circuit for selecting, for each kind of input variable, one of membership function values outputted from the MFC array, said one membership function value conforming to a preset rule; a second selector circuit for selecting one of membership functions outputted from the MFG array, said one membership function conforming to a preset rule; and an operation unit for achieving a predetermined fuzzy inference operation on outputs from said first and second selector circuits.

According to the first invention, there are prepared MFC arrays as many as there are linguistic information items for each variable and MFG arrays as many as there are linguistic information items. Membership functions asociated with the linguistic information items are set together in a form of an array. For each linguistic information item, a membership function value (a grade indicating a degree at which an input variable belongs to a membership function) for an input is outputted in a parallel fashion such that the outputs are supplied to the respective individual inference sections and that membership function values are selected in conformity with the linguistic information items set to the rules.

In consequence, according to the first invention, the following effects are developed.

A membership function for the same linguistic information need only be set only once, and hence the setting error does not take place.

Since the linguistic information setting is accomplished at a position, the linguistic information can be easily expanded.

Since membership information items with respect to the linguistic information are not duplicated, the space and cost associated with the information are advantageously reduced.

A fuzzy inference apparatus according to the second invention is characterized by comprising a set of MFCs of which the number is equal to the number of associated inference systems, a set of MFGs disposed as many as there are associated systems, first selector means for selecting either one of the MFCs in response to a variable selection input, second selector means for selecting either one of the MFGs in response to a variable selection input, and a fuzzy operation circuit achieving computation to produce outputs from the selected MFC and MFG.

In consequence, according to the second invention, depending on an inference system to be employed, the corresponding MFC and MFG are selected so as to switch the inference system in a time-series fashion on the same fuzzy inference apparatus, which enables a hierarchic inference to be easily achieved.

A fuzzy inference apparatus according to the third invention is characterized by comprising MFC array sets including MFC arrays of which the number is equal to the number of associated inference systems, each array including a required number of MFCs, MFG array set including MFG arrays disposed as many as there are associated systems, each array comprising a required number of MFGs, first selector means for selecting either one of the MFC arrays from the MFC array set in response to a variable selection input, second selector means for selecting either one of the MFG arrays from the MFG array set in response to a variable selection input, third selector means for selecting, from membership function values outputted from the MFC array selected by first selector means, a value conforming to a preset rule, fourth selector means for selecting, from membership functions outputted from the MFG array selected by second selector means, a function conforming to a preset rule, and an operation circuit conducting a fuzzy inference operation on outputs from the third and fourth selector means.

According to the second invention, there are disposed MFC and MFG sets for each rule set and hence the setting operation requires a large amount of human work. However, in accordance with the third invention, the membership function for the same linguistic information need be achieved only once, and hence the setting error does not occur. Moreover, since the linguistic information setting is effected at a location, there is developed an advantage that the linguistic information can be easily expanded.

A fuzzy inference apparatus according to the fourth invention includes a first MFC for producing, in accordance with a preset rule, a signal representing a membership function value depending on an input signal, a scan signal generator circuit for generating a scan signal having a fixed period, a second MFC for receiving the scan signal supplied from the scan signal generator circuit so as to produce a signal representing a membership function value depending on an input signal at a timing synchronized with the scan signal, and a first fuzzy operation circuit for achieving a fuzzy operation on the output signals respectively from the first and second MFCs so as to produce an inference output.

The fourth invention defines a single fuzzy inference section. In general, there are disposed a plurality of such inference sections. Desirably, the system includes a concluder section of the following configuration according to the fifth invention.

An apparatus according to the fifth invention is characterized by including a plurality of first fuzzy inference sections, a second fuzzy operation circuit for achieving an operation to integrate output signals from the first fuzzy inference sections and a third arithmetic circuit for receiving the output scan signal from the scan signal generator circuit so as to process the output signal from the second fuzzy operation circuit, thereby translating the signal into a signal representing a nonfuzzy value.

According to the fourth and fifth inventions, the membership function of the consequent is produced from the second MFC. Since the signal outputted from the second MFC is represented as a function with respect to time on a single line, the required number of lines is reduced so as to simplify the system configuration. Moreover, the output signal from the second MFC represents continuous values. In addition, since the same signal is employed for the scan signal of the nonfuzzy value operation and that for the second MFC, these circuits are guaranteed to be synchronized with each other to accomplish an operation with a high precision.

A fuzzy inference apparatus according to the sixth invention include membership function circuit means disposed for each preset rule to output, in accordance with a antecedent of said each rule, an signal representing membership function values corresponding to input signals, first operation means for achieving a predetermined operation, for each said rule, on signals outputted from the membership function circuit means, setting means disposed for each preset rule to set a center position of a membership function of a consequent of each said rule, second arithmetic means for achieving a multiplication, for each said rule, between a value produced from the first operation means and the value representing the center position set by the setting means, third arithmetic means for conducting an addition of a value representing a product attained from the second arithmetic means between a plurality of preset rules, fourth means for conducting an addition of a value outputted from the first operation means between a plurality of preset rules, and fifth arithmetic means for dividing the results of arithmetic operations conducted by the third arithmetic means by the results of arithmetic operations conducted by the fourth arithmetic means.

In accordance with the sixth invention, based on the output value from the first operation means and the value representing the center position of the membership function of the consequent, the nonfuzzy output (center of gravity) is obtained through a simple arithmetic operation by use of the second, third, fourth, and fifth arithmetic means. Consequently, the constitution and operations of the system are simplified.

As a result, in a case where the fuzzy inference apparatus is implemented in a hardware system, the circuit size is minimized and hence the cost thereof can be reduced.

When the fuzzy inference apparatus is implemented in a software system, the number of required operations is reduced and hence a high-speed processing is possible.

Furthermore, since the setting of the membership function in the consequent can be achieved at a point, the setting operation is simplified.

An apparatus according to the seventh invention includes, in addition to the fuzzy inference apparatus according to the sixth invention, coefficient means for multiplying the output from the first operation means by a coefficient specified for each said rule.

In the fuzzy inference apparatus according to the seventh invention, due to provision of the coefficient means, the value representing the result of the operation of the antecedent attained from the first operation means can be multiplied by a coefficient specified for each said rule.

As a result, for each rule, it is possible to change the degree of importance or a shape of the membership function of the consequent, which increases the freedom of setting operation in the fuzzy inference apparatus.

An apparatus according to the eighth invention includes a plurality of membership function circuits or membership function generator circuits for producing signal representing a membership function such that a fuzzy operation is executed based on signals delivered from the plural circuits and is characterized in that the membership function circuits or membership function generator circuits are implemented as separate units so as to be detachably mounted on the fuzzy inference apparatus.

Between the main body of fuzzy inference apparatus and the membership function circuits or membership function generator circuits, the power and signals need only communicate via contact points such as plugs. By providing a plurality of membership function circuits or membership function generator circuits, the setting and alteration of fuzzy inference rules and membership functions can be achieved by replacing membership function circuits or membership function generator circuits, namely, the setting and altering operations can be achieved in a quite efficient fashion.

In accordance with the eighth invention, since the membership function circuits or membership function generator circuits are detachably installed in the body of the apparatus, adjustment of fuzzy inference rules and membership functions can be correctly accomplished by replacing membership function circuits or membership function generator circuits; furthermore, even when a plurality of control objects are to be controlled, fuzzy inference rules and membership functions suitable for the control objects can be set only by replacing membership function circuits or membership function generator circuits. In consequence, the adjustment of the fuzzy inference apparatus is facilitated and a single unit of apparatus can be efficiently utilized.

An apparatus according to the ninth invention is characterized by including memory means for storing therein function values corresponding to a plurality of reference variable values as reference function values and supplement means for reading from the memory reference function values of reference variable values between which an input variable value exists so as to effect an approximation of a function value of the input variable value to produce the function value.

In the function generating unit according to the ninth invention, when a variable is supplied thereto, (two) reference variable values (preceeding and succeeding) the input variable values are detected so as to read out from the memory reference function values associated with these reference variable values. Based on the reference function values, an approximation is conducted to attain a function value corresponding to the input variable value. The approximate computation is achieved in a known method, for example, in a linear approximation.

In the function generating unit according to the ninth invention, reference function values associated with a plurality of reference variable values selected from the continuously changing variables are beforehand stored in a memory, so that for any input variable value, an approximation is achieved to attain a function value of the input variable value by use of the reference function values. In consequence, when the function generating unit is employed in a membership function circuit or a membership function generator circuit, the capacity of the memory for storing therein the membership functions can be minimized. Furthermore, when establishing a membership function, the setting operation can be accomplished with a precision (roughness) of a degree at which a human can judge own senses. When the membership function is adopted to achieve a fuzzy inference, there is attained a higher and satisfactory precision. Moreover, even when such a high precision is developed, the operation speed is rarely lowered.

The function generating unit may be used, in addition to the membership function circuit or the membership function generator circuit, as various pattern storage circuits.

BRIEF DESCRIPTION OF THE DRAWINGS

These and other objects and advantages of the present invention will become apparent by reference to the following description and accompanying drawings wherein:

FIGS. 2 and 3 are schematic diagrams showing a fuzzy inference procedure;

FIG. 8 and FIGS. 9a to 9d are diagrams showing control examples in which FIG. 8 is a diagram showing the configuration of a liquid surface level control and FIGS. 9a to 9d are graphs showing various membership functions;

FIG. 15 is a block diagram showing an embodiment according to the fourth and fifth inventions;

FIG. 16 is a graph showing input/output characteristics of a membership function circuit;

FIGS. 17a, 17b, and 17c are graphs showing waveforms of input/output signals in the respective blocks of an individual inference section;

FIGS. 18a, 18b, and 18c are graphs showing waveforms of input/output signals in the respective blocks of a concluder section;

FIGS. 19 to 22 are diagrams showing an embodiment according to the sixth invention in which:

FIG. 19 is a schematic diagram showing a fuzzy inference procedure associated with a rule;

FIG. 20 is a block diagram showing the constitution of a fuzzy inference engine as the embodiment;

FIG. 21 is a circuit diagram showing a specific example including a multiplier and an adder;

FIG. 22 is a circuit diagram showing another example of the multiplier;

DESCRIPTION OF THE PREFERRED EMBODIMENTS

Figure 1:
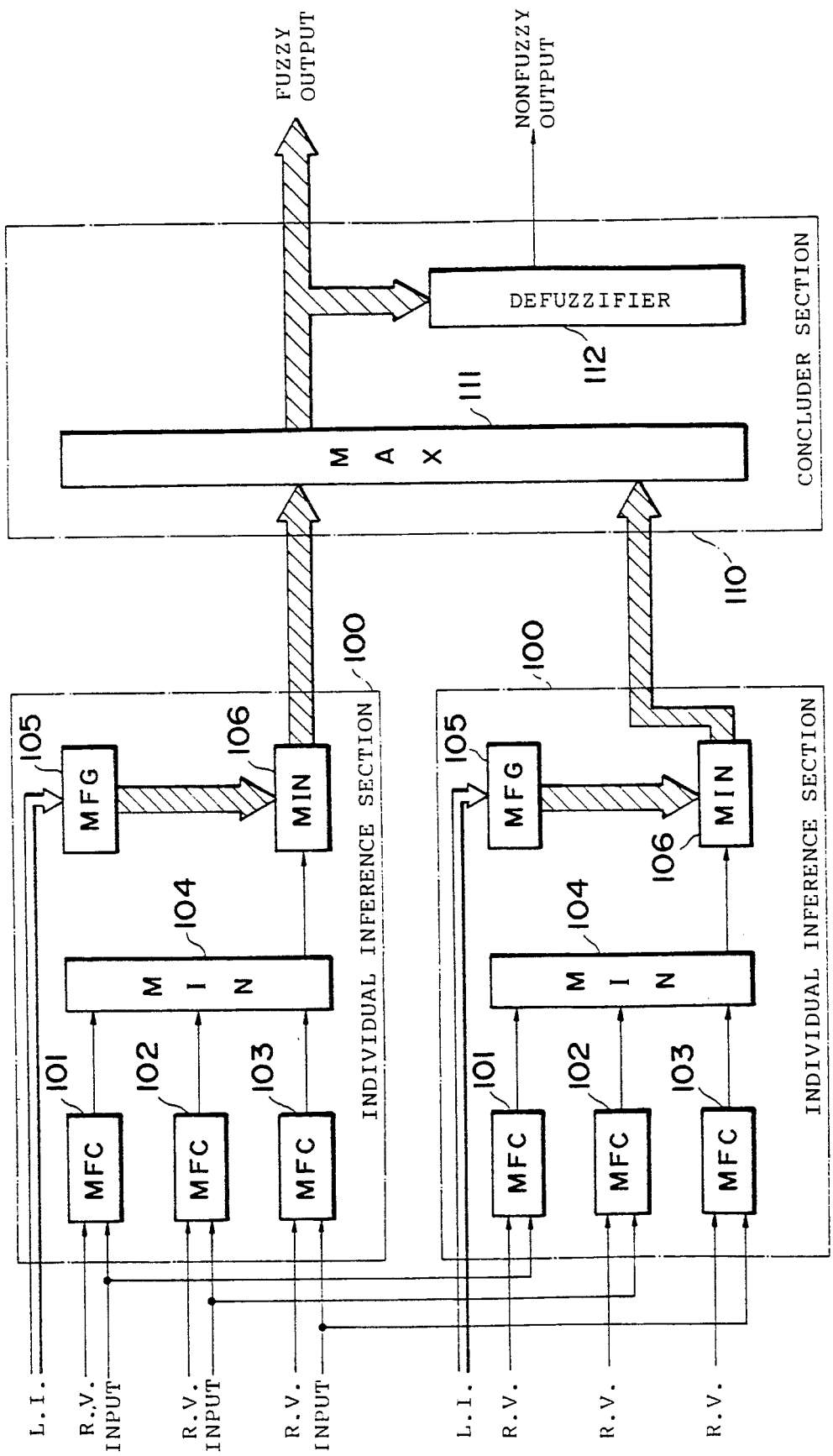
FIG. 1 is a schematic diagram showing the constitution of a conventional fuzzy inference apparatus or engine.
Figure 4:
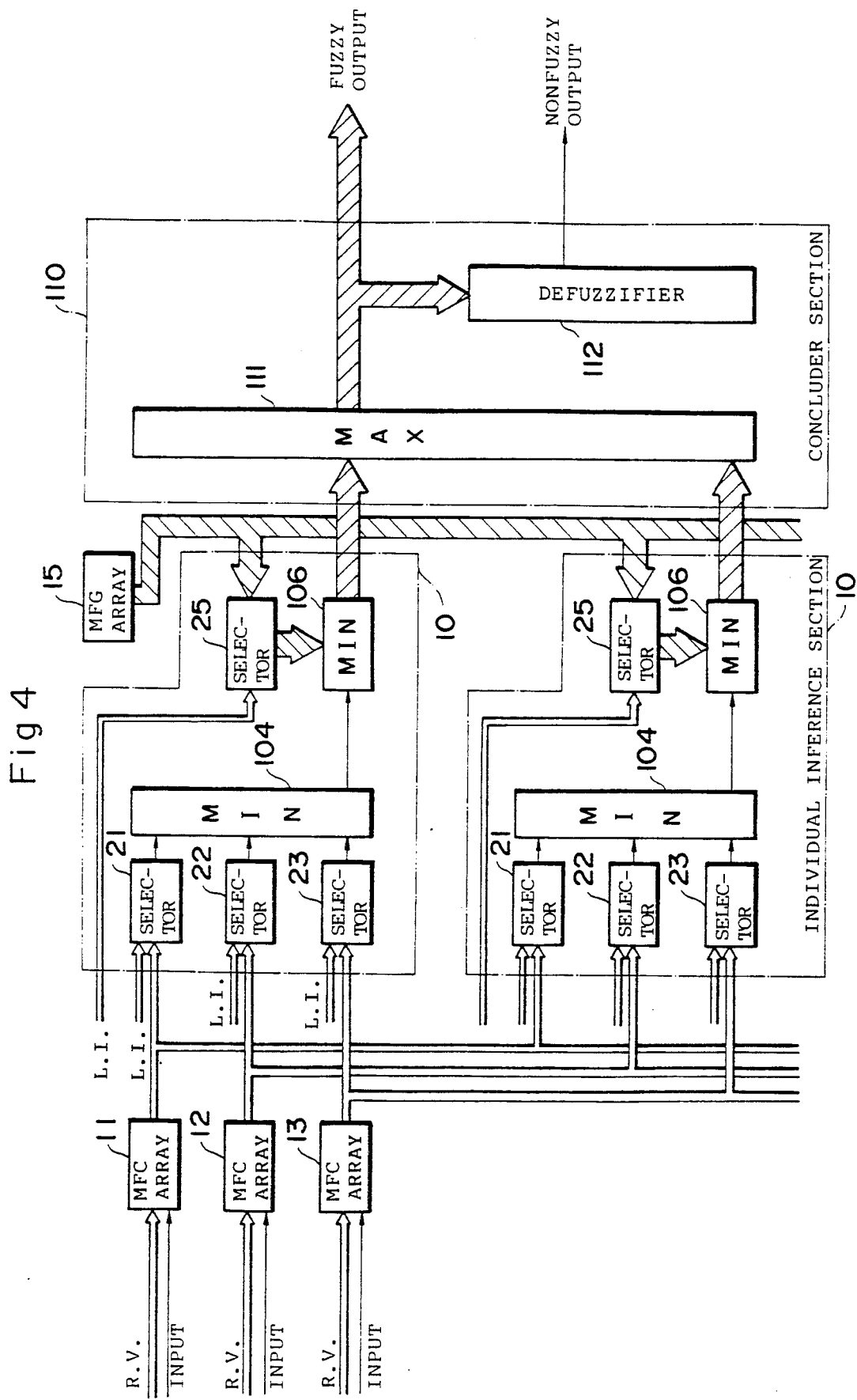
FIG. 4 is a block diagram schematically showing the configuration of a fuzzy inference engine as a first embodiment according to the present invention.

FIG. 4 shows the constitution of a fuzzy inference engine as an embodiment according to the first invention. Constituent components identical to those shown in FIG. 1 are assigned with the same reference numerals.

Figure 5:
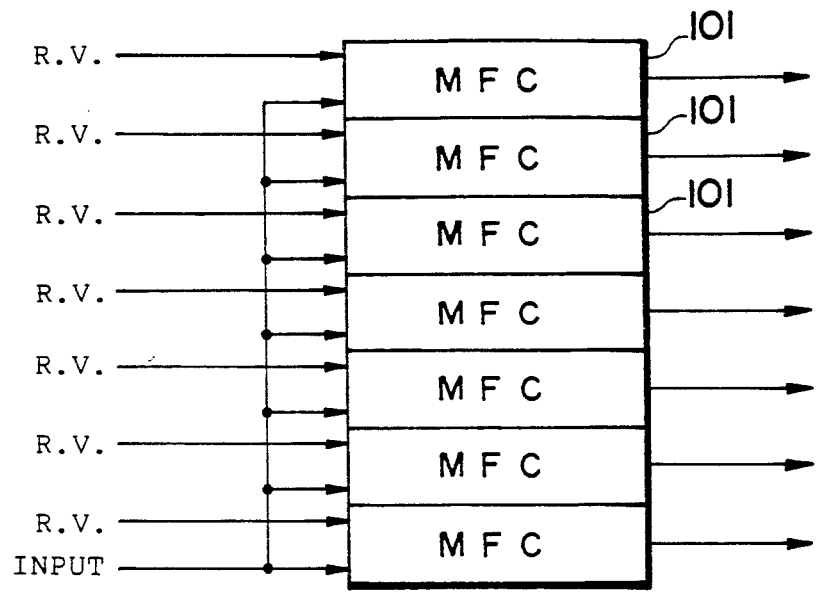
FIG. 5 is a diagram showing the constitution of a membership function circuit array.
Figure 7:
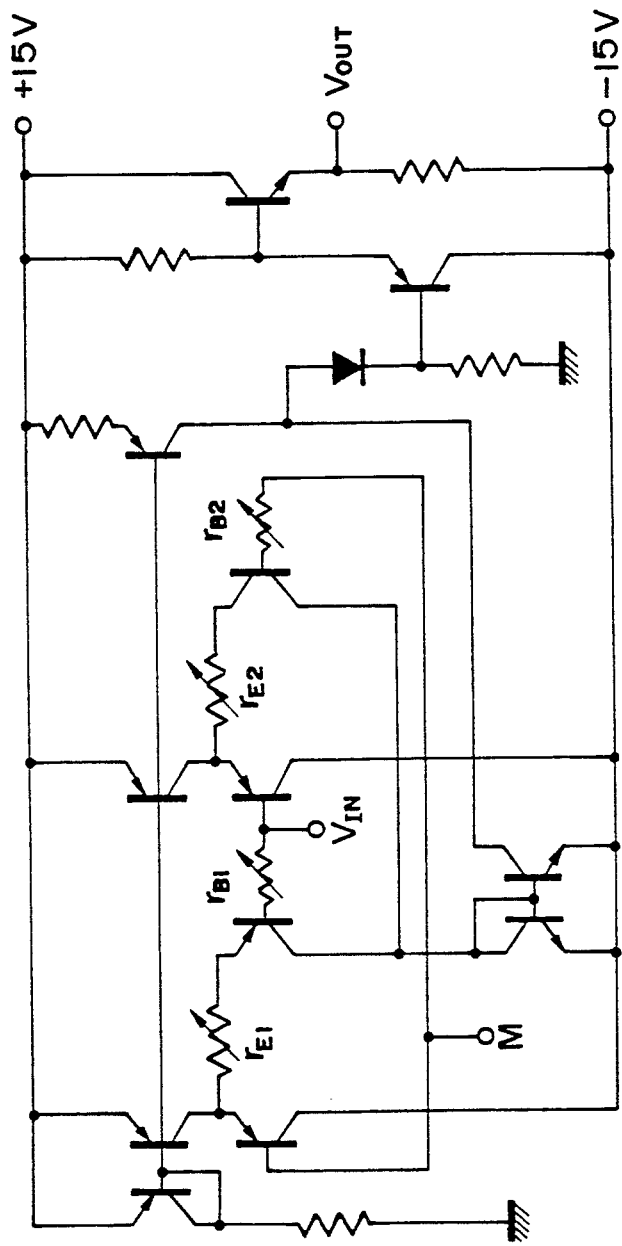
FIG. 7 is a circuit diagram schematically showing an example of the membership function circuit.
Figure 8:
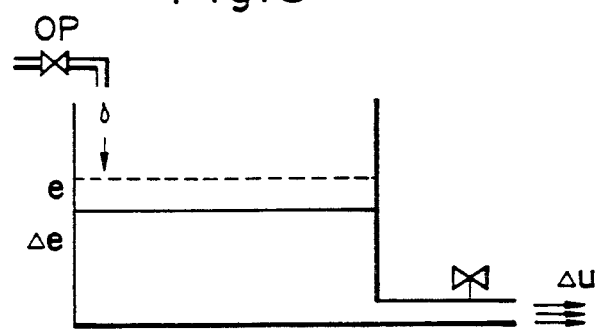
Figure 9A:
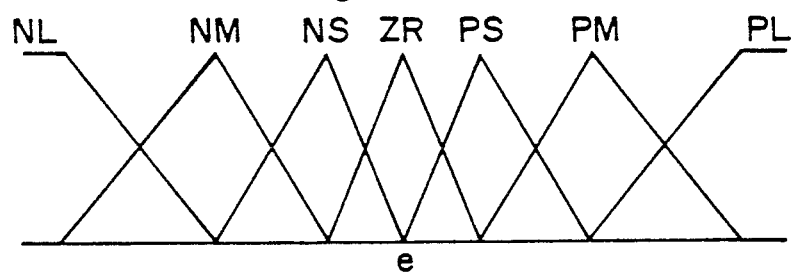
Figure 9B:
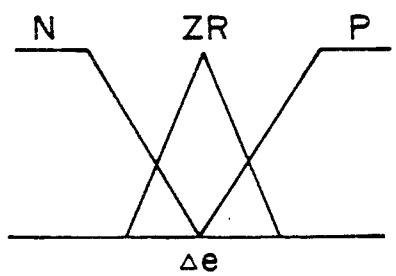
Figure 9C:
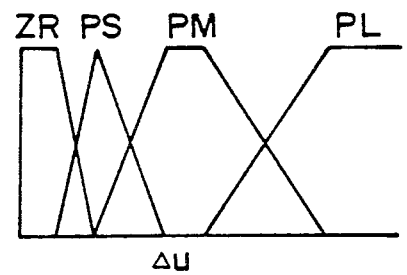
Figure 9D:
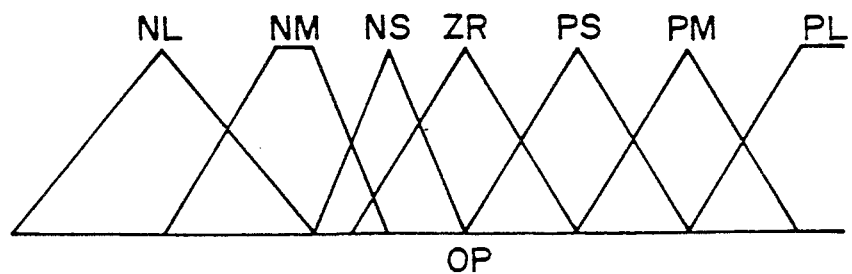

In association with three kinds of input variables, there are disposed three MFC arrays 11, 12, and 13. The MFC array 11 includes, as shown in FIG. 5, MFCs 101 of which the number is identical (seven in this example) to the number of kinds of linguistic information items. Each MFC is supplied with a reference voltage corresponding to one of linguistic information items PL to NL. FIG. 7 shows an example of a concrete constitution of the MFC 101. In this constitution, a reference voltage is applied to a terminal M such that a membership function is produced in a triangle form with the voltage as the center position (an input associated with the peak value of the membership function) of the triangle. In this case, the input and output voltages are represented as $V_{IN}$ and $V_{OUT}$. The membership function of the triangle shape has a gradient determined by resistors $r_{E1}$ and $r_{E2}$. By changing these resistors $r_{B1}$ and $r_{B2}$, the membership function may have a trapezoidal shape. In FIG. 5, the same input is supplied to seven MFCs 101, which then respectively produce function values with variables set as the inputs of the membership function representing preset linguistic information. Other MFC arrays 12 and 13 are also configured in the same fashion.

The configuration further includes individual inference sections 10. Each section 10 includes three selector circuits 21 to 23, which receive the outputs from the MFC arrays 11 to 13, respectively. Each of the selector circuits 21 to 23 is provided with a code representing linguistic information (abbreviated as L.I. in the figures as described above) such that of the outputs from the MFC arrays 11 to 13, membership function values associated with the linguistic information are respectively outputted from the selector circuits 21 to 23 so as to be fed to a logic intersection circuit 104.

Figure 6:
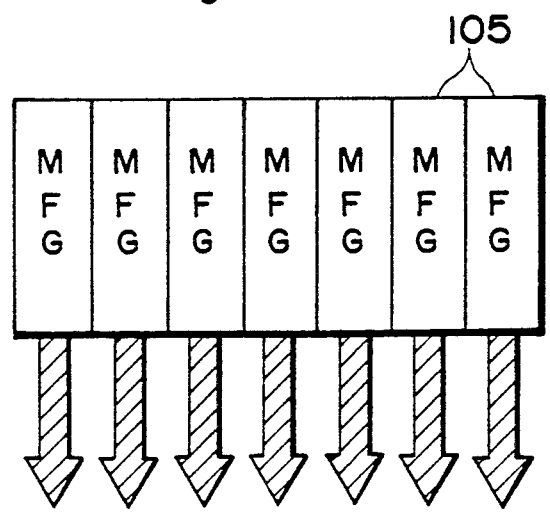
FIG. 6 is a schematic diagram showing the constitution of a membership function generator circuit array.

The system includes an MFG array 15 constituted with seven MFGs 105 as shown in FIG. 6. Each MFG 105 generates a membership function associated with seven linguistic information items including PL to NL. The MFG array 105 delivers an output (a voltage distribution representing a membership function) to be supplied to a selector circuit 25. Among the seven kinds of membership functions thus supplied, the selector circuit 25 selects a function associated with the linguistic information inputted thereto so as to feed the selected function to a logic intersection circuit 106.

Since each MFG 105 is connected to 25 output lines, the MFG array 15 is linked to the selector circuit 25 by means of 25×7 output lines. However, if the MFC array 15 is designed to produce seven kinds of membership functions in a time-shared fashion and the selector 25 is configured to include a latch circuit so as to latch only the selected membership function, there need only 25 output lines. For a specific example of MFG, reference is to be made to the Japanese Patent Laid-Open Publication No. 63-123177 (associated with the U.S. patent application Ser. No. 116,777 and E.P. Application Number 87 116 529.6 described above.)

As an example of control operation, let us consider a case where the liquid surface of a cistern is to be kept at a fixed level.

Assume here that inputs thereto are considered in association with a deviation e of the present liquid surface level with respect to a preset value (or level), a variation $\Delta$ e of deviation, discharge flow rate $\Delta$ u and that an output is represented by use of a valve opening OP to control the liquid flow rate. For these input and output data, the following linguistic information items are adopted.

Linguistic information for e
PL, PM, PS, ZR, NS, NM, and NL.
Linguistic information for $\Delta$ e
P, ZR, and N.
Linguistic information for $\Delta$ u
ZR, PS, PM, and PL.
Linguistic information for OP
PL, PM, PS, ZR, NS, NM, and NL.

FIGS. 9a to 9d show membership functions associated with these linguistic information items.

In the fuzzy inference engine or apparatus of FIG. 4, it is only necessary to dispose seven, three, and four MFCs 101 in the MFC array 11 for the deviation e, the MFC array 12 for the change $\Delta$ e, and the MFC array 13 for the discharge flow rate $\Delta$ u, respectively. The MFG array 15 for the valve opening OP includes seven MFGs 105 in this situation.

Measured inputs $e_0$, $\Delta$ $e_0$, and $\Delta$ $u_0$ are respectively supplied to the MFC arrays 11 to 13. The value $e_0$ is simultaneously supplied to the respective MFCs 101 of the MFC array 11 for the deviation e such that membership function values indicating a degree of adaptation to the respective linguistic information (a degree at which the value belongs to the membership function) are outputted in a parallel fashion. The membership function values are supplied in a parallel fashion to the inference sections 10 having rules employing the value e. By use of the selector circuit 21 of each inference section 10, either one of the input membership function values is selected depending on the supplied linguistic information. The similar processing is also achieved for $\Delta e_o$ and $\Delta u_o$.

Also for the opening OP, membership functions associated with the respective linguistic information items are set to the MFG array 15 so as to be delivered to the respective inference section 10, so that based on the linguistic information of a rule associated with each inference section, the selection of membership function value is achieved for each inference section. A fuzzy inference is thus conducted to output a determinant value or an integrated of valve opening $OP_o$ from the defuzzifier 112.

Figure 10:
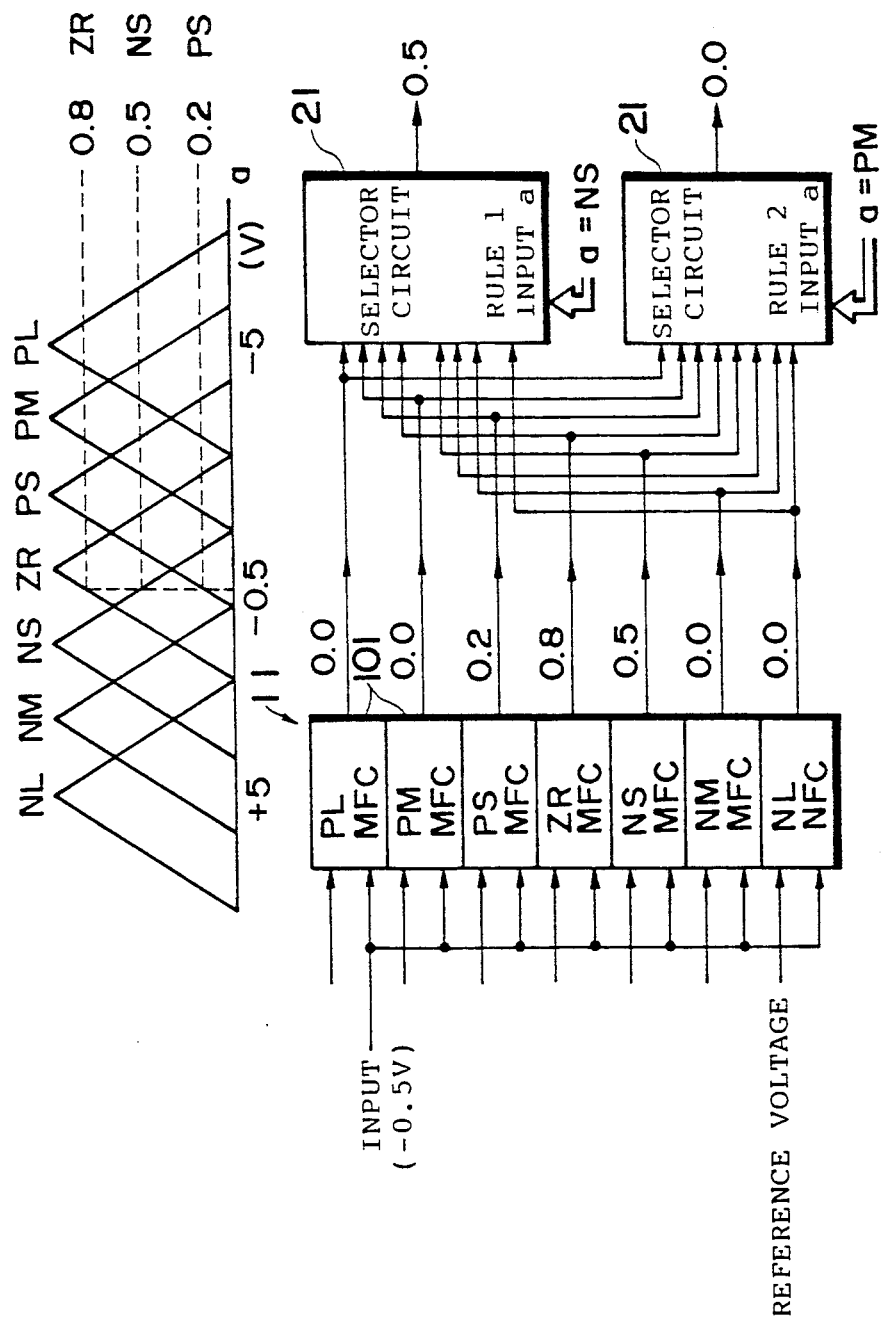
FIG. 10 is an explanatory diagram useful to explain an operation in which membership function values are produced.

FIG. 10 shows an operation in which when an input a is supplied to the MFC array 11, membership function values related to the respective linguistic information items are produced therefrom. For the input $a = -0.5$, the respective membership function values are obtained. In rule 1, the linguistic information is represented as $a = NS$, the selector circuit 21 selects a signal on a line of NS to develop an output 0.5. Similarly, in rule 2, a signal on a line of PM is selected to output a value 0.0.

In the embodiment above, although the fuzzy inference engine is of an analog type, it is natural that the present invention is applicable to an apparatus of a digital type.

Figure 11:
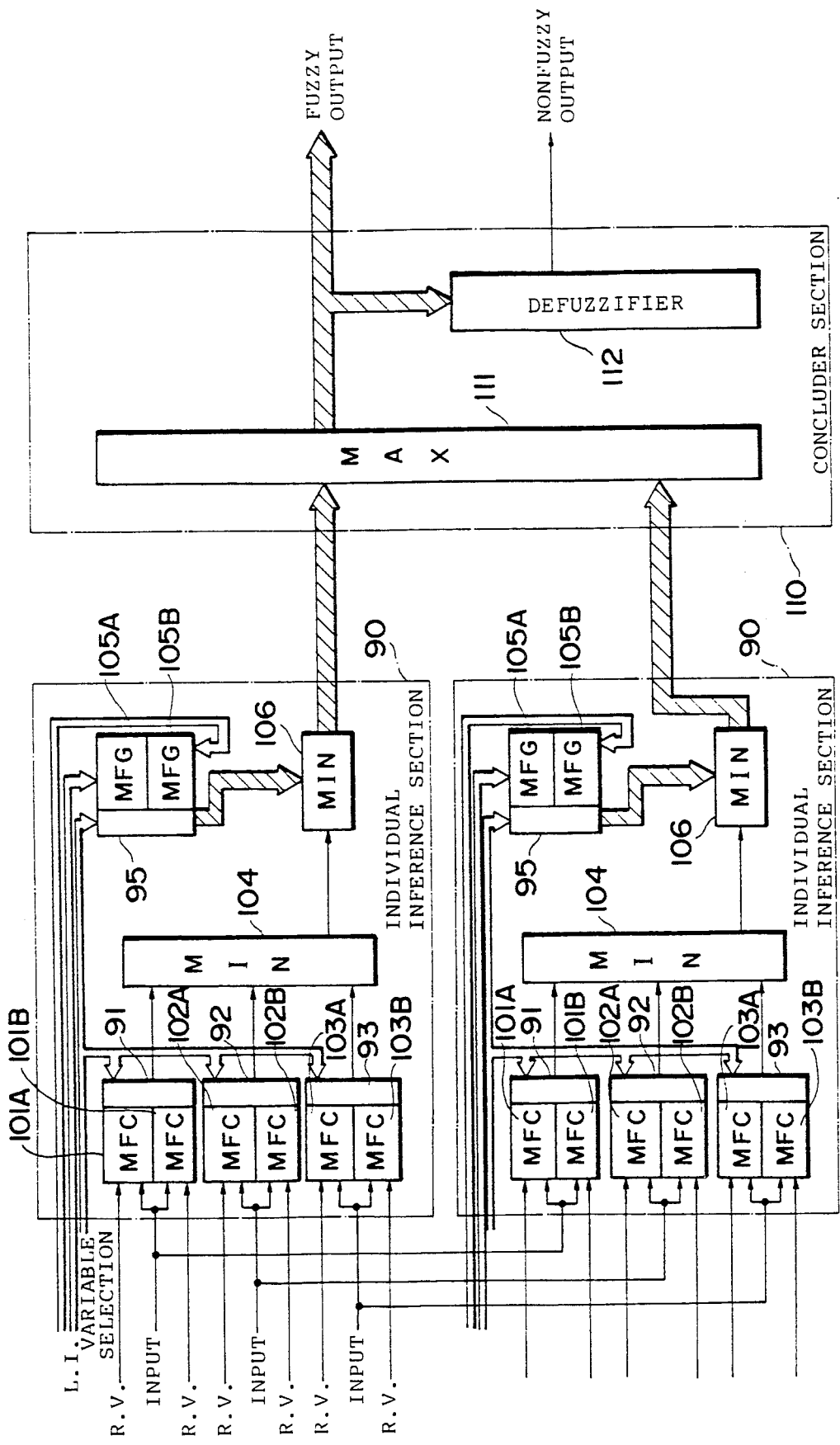
FIG. 11 is a block diagram schematically showing the configuration of a fuzzy inference engine as a second embodiment according to the present invention.

FIG. 11 shows a configuration of a fuzzy inference engine as an embodiment according to the second invention. The same constituent elements as those of FIG. 1 are assigned with the same reference numeral. This embodiment is employed for a two inference systems.

In each individual inference section 90, there are disposed MFC sets each including two MFCs (namely, MFCs 101A and 101B, MFCs 102A and 102B, and MFCs 103A and 103B). This system further comprises variable selector circuits 91, 92, and 93 associated with the three MFC sets, respectively. Each of the MFCs above is supplied with a reference voltage conforming to a preset rule. A concrete constitution of the MFCs are the same as that shown in FIG. 7.

Figure 12:
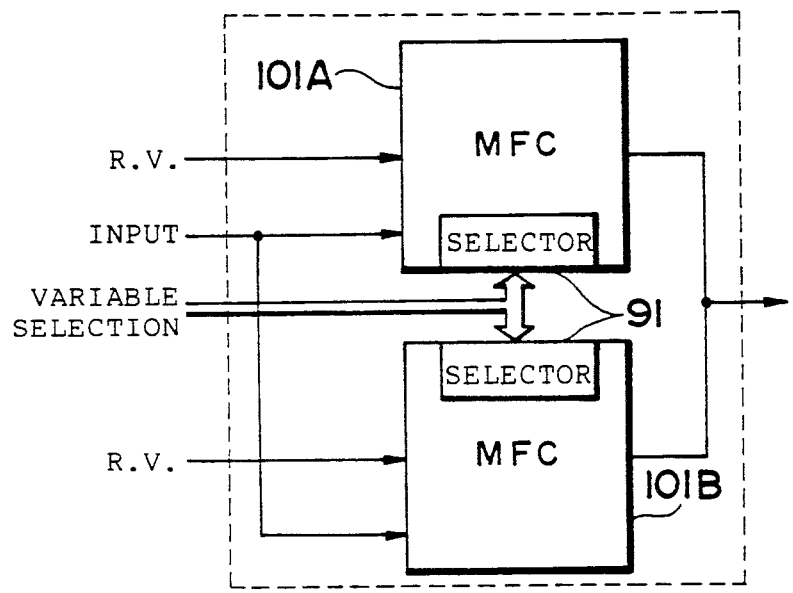
FIG. 12 is a diagram showing the constitution of a membership function circuit array set.

FIG. 12 shows a configuration example of a set of MFCs 101A and 101B. Each MFC includes a selector as a variable selecting circuit 91. It is possible to register a variable name to the selector. When a variable name registered to the selector matches with a variable selection signal supplied thereto, the associated MFC is set to an active state to operate as a membership function circuit. It may also be possible that the MFCs 101A and 101B are caused to continuously operate as membership function circuits so as to selectively output signals therefrom depending on a variable selection signal. The similar operation is carried out in the other MFC sets respectively including the MFCs 102A and 102B and the MFCs 103A and 103B. The selected MFC output is supplied to the logic intersection circuit 104.

Figure 13:
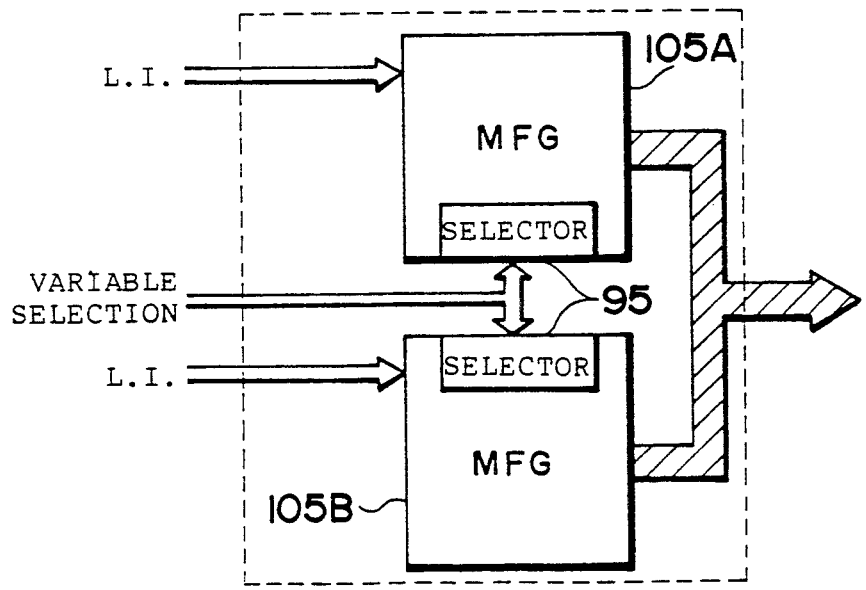
FIG. 13 is a schematic diagram showing the constitution of a membership function generator circuit array set.

In a similar fashion, each inference section 90 includes the MFGs 105A and 105B and a variable selection circuit 95 for achieving a selection depending on a varible selection signal. FIG. 13 shows a configuration example of these constituent elements. Each of MFGs 105A and 105B includes a selector to which a variable name can be registered such that by one of the selectors having a variable name identical to a variable name supplied in a form of a variable selection signal sets the associated MFG 105A or 105B to an active state. Or, an output from the associated MFG is selectively obtained to be fed to the logic intersection circuit 106. For a specific example of the MFG, reference is to be made to, for example, the Japanese Patent Laid-Open No. 63-123177 as described above.

In the circuit constitution above, two systems of inference operations can be achieved in an online and time-series fashion by use of the same inference engine.

For example, assume here that two systems of inference operations are given as follows.

$$\text{if } a=A, b=B, c=C, \text{ then } u=U \quad (1)$$

$$\text{if } d=D, e=E, f=F, \text{ then } v=V \quad (2)$$

For the inference of expression (1), the variable selection signal line is supplied with a signal to select a membership function of expression (1). For the inference of expression (2), the variable selection signal line is supplied with a signal to select a membership function of expression (2). The operations are sequentially changed over therebetween so as to attain an output of the inference result, thereby enabling the two-system inference operation to be achieved by use of an inference engine or apparatus. In a configuration in which an output from one of two inference systems is kept retained so as to be employed as an input to other one inference system, a hierarchic inference can be accomplished in an inference engine.

Figure 14:
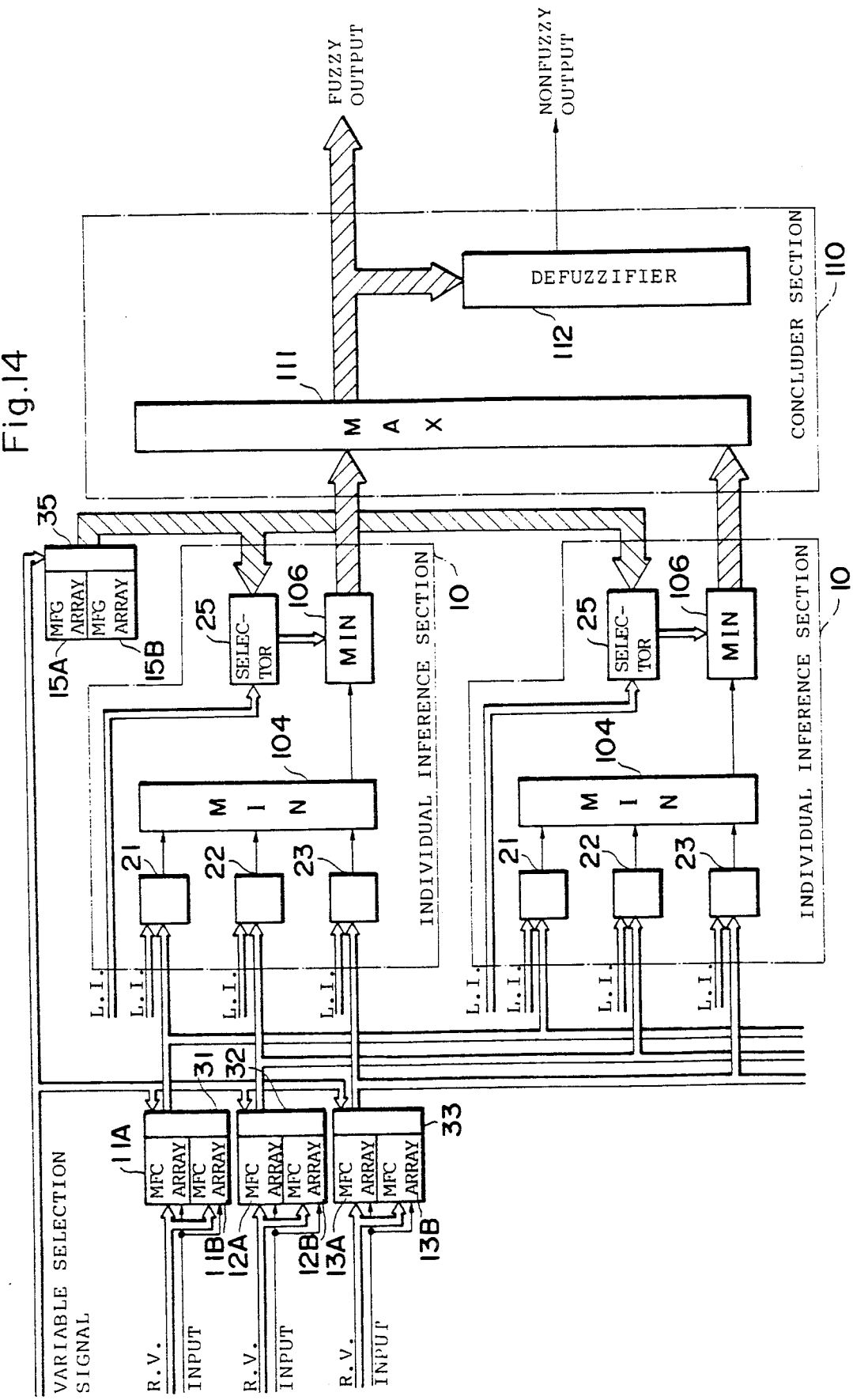
FIG. 14 is a block diagram schematically showing the configuration of a fuzzy inference engine as a third embodiment according to the present invention.

FIG. 14 shows an embodiment of the inference engine in acordance with the third embodiment. In this constitution, with respect to inference sections 10, MFCs and MFGs are externally disposed in association with all linguistic information items. The system comprises MFC array sets of MFC arrays 11A and 11B, MFC arrays 12A and 12B, and MFC arrays 13A and 13B and variable selector circuits 31, 32, and 33 for selecting either one of the associated MFC arrays depending on a variable selection signal. The variable selector circuits can be implemented by use of selectors described above. Each MFC array includes MFCs 101 of which the number is identical to that of kinds of linguistic information items (seven in this embodiment) as shown in FIG. 5.

All MFCs 101 constituting two MFC arrays of each MFC array set are supplied with the same input such that one of the MFCs 101 of the MFC arrays selected depending on the variable selection signal produces a function value corresponding to an input related to a membership function representing preset linguistic information. This is also the case for the other MFC array sets.

Each inference section 10 includes three selector circuits 21, 22, and 23, which are respectively supplied with outputs from the selected ones of the MFC arrays 11A and 11B, MFC arrays 12A and 12B, and MFC arrays 13A and 13B, respectively. The selector circuits 21, 22, and 23 are respectively supplied with codes representing linguistic information. Among the outputs from the MFC arrays above, the function values of the membership functions associated with these linguistic information items are delivered from the selector circuits 21, 22, and 23, respectively. The selector circuits 21, 22, and 23 deliver outputs therefrom to a logic intersection circuit 104.

Similarly, the system includes MFG array sets of MFG arrays 15A and 15B. Each MFG array is constituted with seven MFGs as shown in FIG. 6. Either one of each MFG array set is selected in a similar fashion depending on a variable selection signal. The selected MFG array 15A or 15B delivers an output (a voltage distribution representing a membership function) to a selector circuit 25. From seven kinds of membership functions, the selector circuit 25 selects a membership function corresponding to linguistic information supplied thereto so as to deliver the function to a logic intersection circuit 106.

Each MFG 105 is linked with 25 output lines; in consequence, the selected MFG array 15A or 15B is connected to the selector circut 25 by means of $25 \times 7$ output lines. However, the MFG array 15A or 15B may be configured to produce seven kinds of membership functions in a time-shared manner and the selector circuit 25 includes a latch circuit such that only the selected membership function is latched therein, which necessitates only 25 output lines to be provided for the MFG arrays 15A and 15B.

Although the embodiment above includes a fuzzy inference engine of an analog type, it goes without saying that the present invention is also applicable to apparatuses of a digital type.

FIG. 15 shows a configuration of a fuzzy inference engine as an embodiment in accordance with the fourth and fifth inventions. The same constituent components as those of FIG. 1 are assigned with the same reference numerals.

This system includes individual inference sections 40 each comprising an MFC 41 to produce a membership function of a consequent. The MFC 41 is supplied with a scan signal delivered from a scan waveform generator circuit 49. The scan signal has a fixed period and may be a sawtooth wave, a triangular wave, or the like. The MFC 41 supplies an output signal to a logic intersection circuit 42, which conducts a MIN operation between the received output signal and an output signal from a logic intersection circuit 104 so as to produce the MIN result as an output from the inference section 40.

The MFCs 101 to 103 and the MFC 41 can be configured with completely the same circuits. A concrete example of the configuration is as shown in FIG. 7. Each of the MFCs 101–103 is supplied with an input $V_{IN}$ as an input signal thereto so as to deliver an output $V_{OUT}$ to the logic intersection circuit 104. The MFC 41 receives as an input $V_{IN}$ thereto an output scan signal from the scan waveform generator circuit 49. The output $V_{OUT}$ is supplied to the logic intersection circuit 42.

FIG. 16 shows an example of relationships between the input $V_{IN}$ and the output $V_{OUT}$ of the MFC 41 in which the reference voltage applied to a terminal M is set to 2 V. The input $V_{IN}$ is assumed to vary in a range from $-5$ V to $+5$ V.

FIGS. 17a, 17b, and 17c show along an axis of time (t) the input (scan) signal $V_{IN}$, the output signal $V_{OUT}$, of the MFC 41, and the output signal from the logic intersection circuit 42 (the inference section 40) in a case where the MFC 41 is employed. The logic intersection circuit 104 producing a waveform of FIG. 17c delivers an output set to 3 V.

Since all inference sections 40 are supplied with the same scan signal, these sections output synchronized signals representing the respective inference results, which are fed to a concluder section 45.

The concluder section 45 includes a logic union circuit 46 for achieving a MAX operation on output signals from the inference sections 40, a discretizer circuit 47 for translating an output signal from the logic union circuit 46 into a set of signals distributed onto a plurality of lines, and a defuzzifier 48 for translating an output signal from the logic union circuit 46 into a signal representing a determinant value. These circuits 47 and 48 are also supplied with the output scan signal from the scan waveform generator circuit 49 so that the various kinds of arithmetic operations are accomplished at a timing synchronized with the scan signal.

The defuzzifier 48 comprises an integration circuit or a peak detector circuit so as to achieve the following operation as a defuzzication to attain a center of gravity CG(V).

$$CG(V) = \int u(t) \cdot Vm(t)dt / \int Vm(t)dt \quad (3)$$

where, u(t) represents a scan signal and Vm(t) stands for an output signal from the logic union circuit 46. The integration period is set to the period of the scan signal.

FIGS. 18a, 18b, and 18c show waveforms of the scan signal u(t), the output Vm(t) from the logic union circuit 46 and the dividend of expression (3). In this case, the logic union circuit 46 receives as one of the inputs a signal of FIG. 17c and as other one input a signal obtained when the output from the logic intersection circuit 104 is 1 V.

Next, a description will be given of an embodiment in accordance with the sixth invention.

FIG. 19 shows an inference procedure of a rule in a case of three kinds of input variables.

Assume here that for given inputs $X_0$, $Y_0$, $Z_0$, etc., the result h is obtained through the MIN operation conducted on function values a, b, and c associated with the membership functions A, B, and C. Applying the MIN results to a membership function D of the consequent, a membership function S having a trapezoidal shape is obtained as indicated by a shade portion in FIG. 19. Namely, this is attained as an inference result from an individual inference section 100 (refer to FIG. 1 for details.)

In a concluder section 110, the inference results S are subjected to a MAX operation. In a case to attain a nonfuzzy output through a method of center of gravity, this section 110 computes the center of gravity from the result of the MAX operation.

If the membership function D of the consequent is horizontally symmetric with respect to the center d, the center of gravity CG is attained from the following expression.

$$CG = \sum_i d_i \cdot h_i / \sum_i h_i \quad (4)$$

where, $i = 1$ to n and n is the number of rules and $d_i$ indicates a position of center of the membership function $D_i$ of the consequent.

Figure 20:
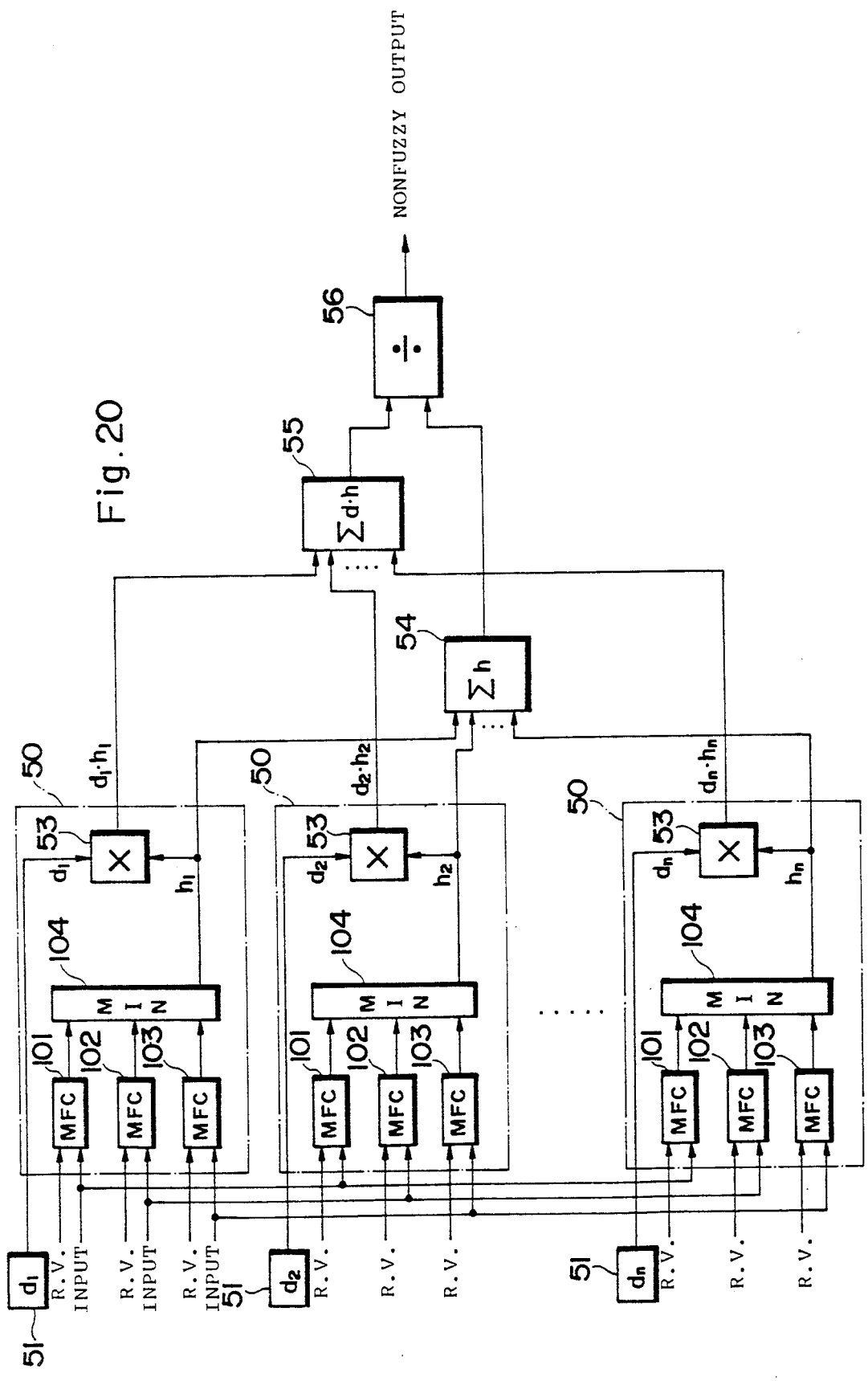

FIG. 20 shows an example of a fuzzy inference engine capable of developing as the final output the center of gravity CG represented by expression (4). In this configuration, the same constituent components as those described above are assigned with the same reference numerals.

This system includes setting devices 51. To each setting device 51, a value is set to represent a center position $d_i$ of the membership function $D_i$ of the consequent. A MIN result $h_i$ produced from a logic intersection circuit 104 is computed with the center position $d_i$ by means of a multiplier 53 to attain a product $d_i \cdot h_i$. The MIN result $h_i$ and the product $d_i \cdot h_i$ are outputted from an individual inference section 50.

The MIN result $h_i$ is added to each other $$\left( \sum_i h_i \right)$$

in an adder 54 for all rules. Moreover, for all preset rules, the product $d_i \cdot h_i$ are similarly added $$\left( \sum_i d_i h_i \right)$$

by an adder 55. The results of additions carried out by these adders 54 and 55 are fed to a divider 56 to achieve the operation represented by the expression (4). In consequence, the divider 56 produces a final nonfuzzy output (center of gravity CG).

Comparing the circuit constitution of FIG. 20 with the conventional example of FIG. 1, the logic intersection circuits 106 and the MFGs are unnecessitated in the embodiment of FIG. 20; furthermore, there need only two output terminals and two wiring lines. In addition, the concluder section 110 can be constituted with an adder and a divider, which simplifies the overall structure of the fuzzy inference engine.

Figure 21:
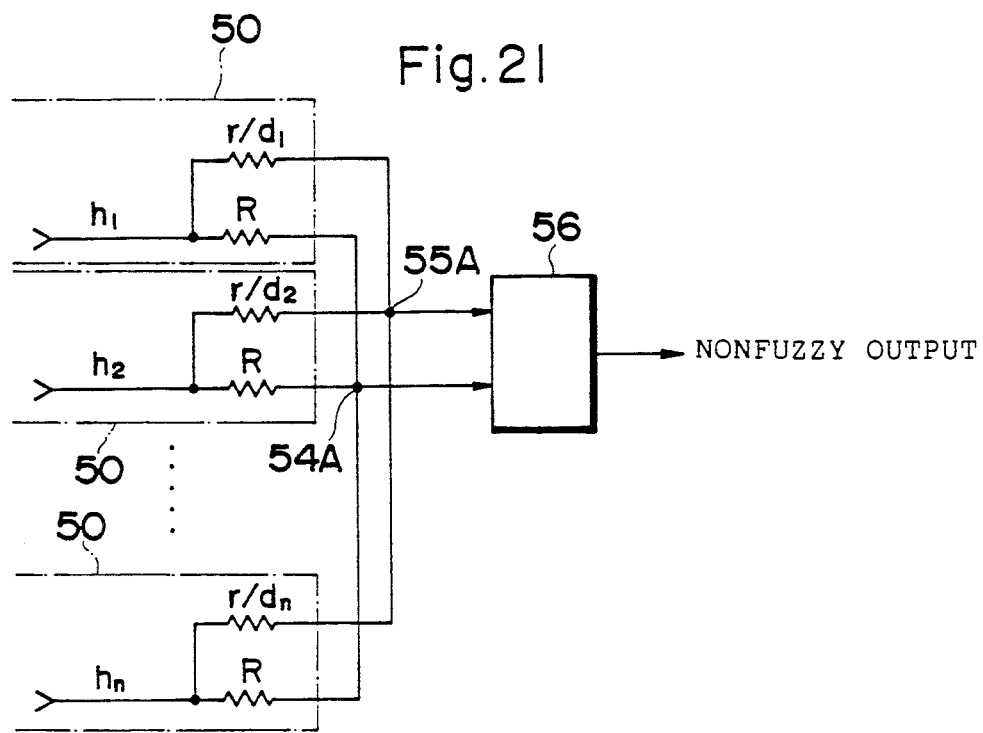

FIG. 21 is a circuit diagram showing a specific example of the multiplier 53 and the adders 54 and 55 implemented by use of analog circuits.

The configuration includes an individual inference section in which a logic intersection circuit 104 produces an output value of a voltage $h_i$. The voltage $h_i$ is applied to a resistor R, which flows a current $h_i/R$. The output voltage $h_i$ is also supplied to a resistor $r/d_i$ to flow a current $(h_i \cdot d_i)/r$. The resistance value of the resistor $r/d_i$ is inversely proportional to a value $d_i$ representing the center position of a membership function set to the consequent. That is, the resistor $r/d_i$ constitutes the setting device 51 and the multiplier 53.

The configuration also includes a wired OR section 54A to conduct an addition of $h_i/R$. The resistor R and the wired OR 54A constitute the adder 54. The adder 55 comprises a wired OR 55A to achieve an addition of the current $(h_i \cdot d_i)/r$. An output from the wired OR 55A is supplied to a divider 56, which divides the output by an output from the wired OR 54A so as to output the result of the division as a nonfuzzy output.

Figure 22:
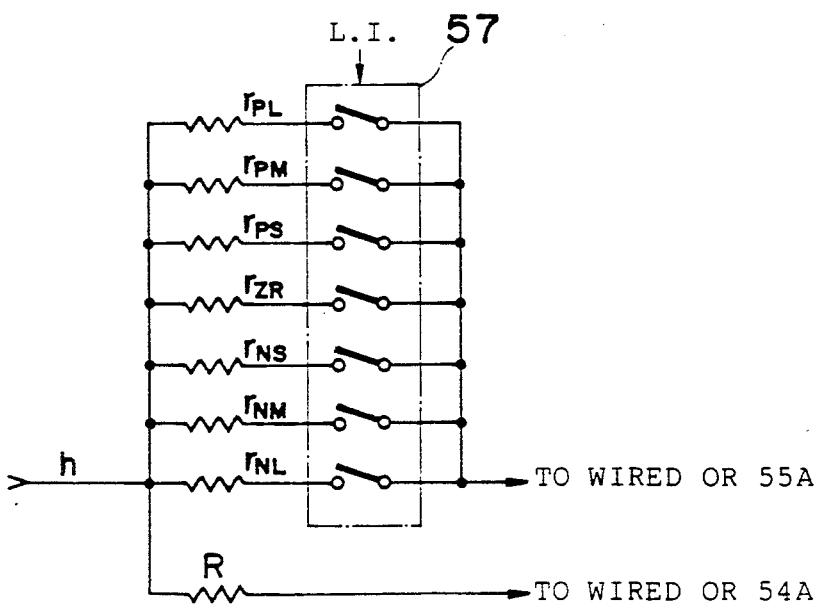

FIG. 22 shows an example of variation of the resistor $r/d_i$ in which the membership function of the consequent can be varied depending on given linguistic information. This configuration includes a parallel connection of resistors $r_{PL}$, $r_{PM}$, $r_{PS}$, $r_{ZR}$, $r_{NS}$, $r_{NM}$ and $r_{NL}$ such that depending on the given linguistic information, one of the resistors is selected by an analog multiplexer 57. These resistors $r_{PL}$ to $r_{NL}$ have resistance values inversely proportional to values representing center positions of the membership functions PL to NL, respectively.

In the embodiment having the constitution above, as compared with the conventional structure of FIG. 1, the equivalent function can be developed by the fuzzy inference engine with a size thereof reduced to one third of the conventional system. Namely, the size of the body of the fuzzy inference engine and the cost thereof can be minimized.

The embodiment above includes the fuzzy inference engine constituted in a hardware system; however, the engine may be constructed with a software system employing the similar processing method (associated with the expression (4)). Also in such a software constitution, the number of processing operations can be reduced and hence the processing speed is accordingly increased.

Incidentally, in the fuzzy inference engine of the embodiment above, all membership functions set to the consequents of rules are limited to the same form in which the width and the gradient are mutually identical among the functions. In short, it is impossible to set membership functions having different forms for the respective rules.

In consequence, although the system above can satisfactorily cope with a simple control, when it is necessary to alter the degree of importance for each rule or to vary the form of membership functions, the system cannot be efficiently applied to such a case.

An embodiment which solves the problems above according to the seventh invention will be described in detail with reference to FIGS. 23 to 25.

Figure 23:
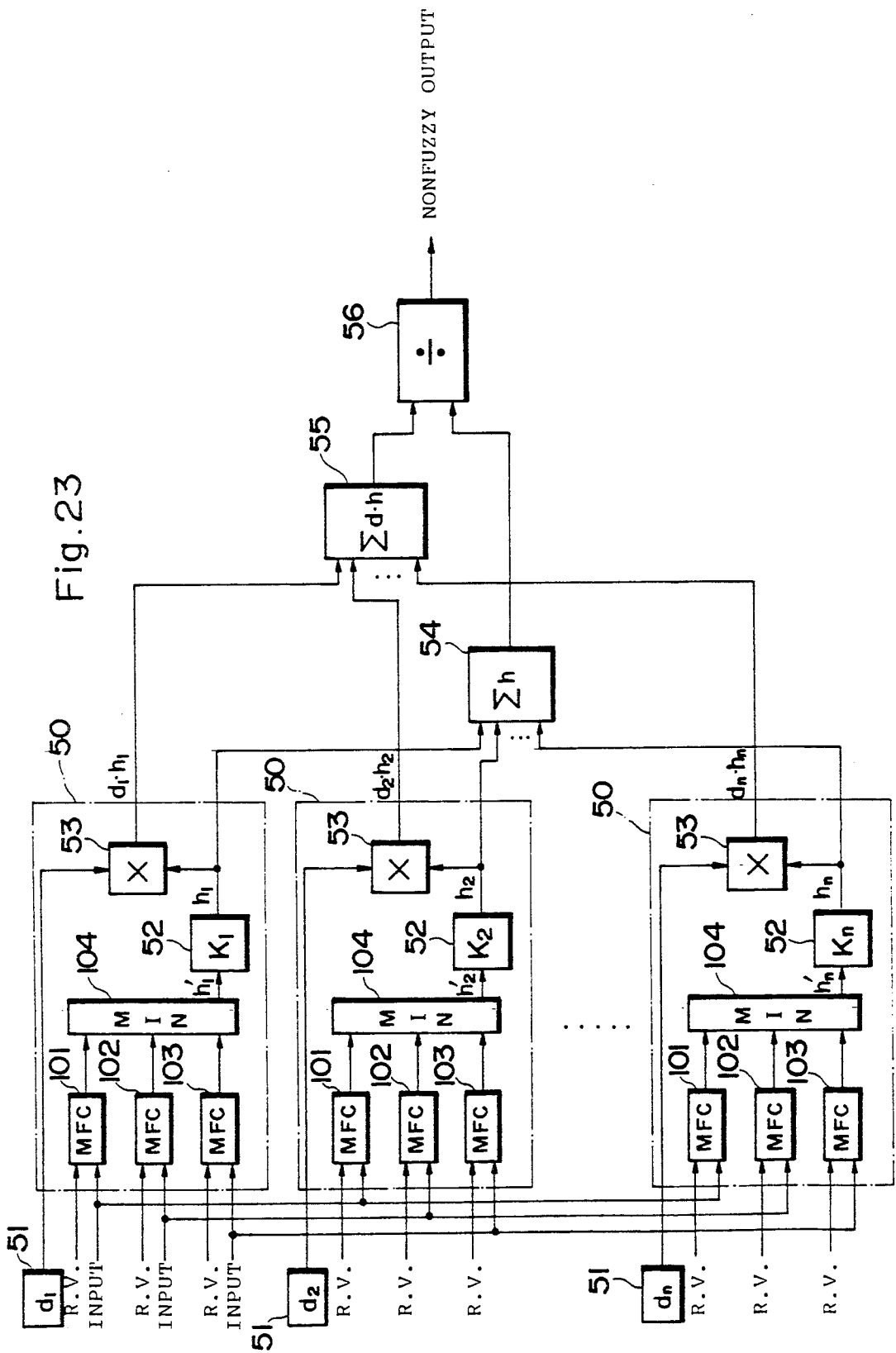
FIG. 23 is a schematic block diagram showing the configuration of a fuzzy inference engine as a seventh embodiment according to the present invention.

The configuration of FIG. 23 differs from that of FIG. 20 in that an amplifier (a coefficient device) 52 is connected between the logic intersection circuit 104 and the adder 54 as well as the multiplier 53. The logic intersection circuit 104 delivers an output $h_i'$ to the amplifier 52, which amplifies the output $h_i'$ with a preset gain (coefficient) K such that a result of the amplification is outputted as an output value $h_i$ from the individual inference section 50. The output $h_i$ is fed to the adder 54 and the multiplier 53.

Figure 24:
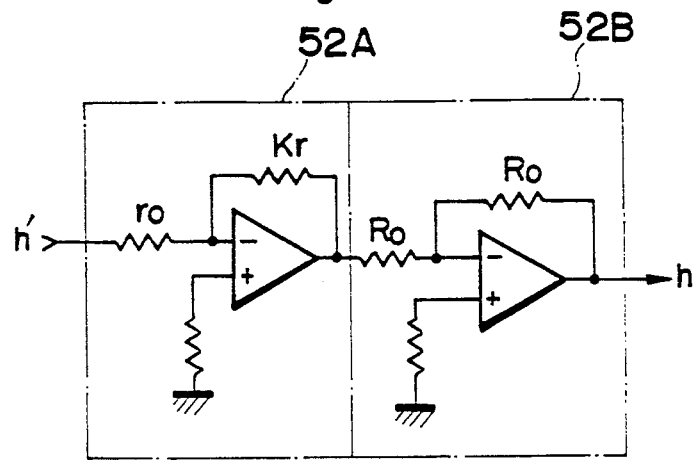
FIG. 24 is a circuit diagram showing a concrete example of an amplifier disposed in the system of FIG. 23.

FIG. 24 shows a concrete example of the constitution of the amplifier 52, which includes two inversion amplifiers 52A and 52B configured in a cascade connection. The amplifier 52A comprises an operational amplifier, an input resistor $r_o$ thereof, and a feedback register $K_r$. Receiving an input $h'$, the amplifier 52A amplifies the input with an amplification factor $-K_r/r_o$. The amplifier 52B at the subsequent stage amplifies an input thereto by an amplification factor $-1$. As a result, the input $h'$ is multiplied by $K = K_r/r_o$, namely, the amplifier 52B produces an output signal $h = K \cdot h'$.

Figure 25:
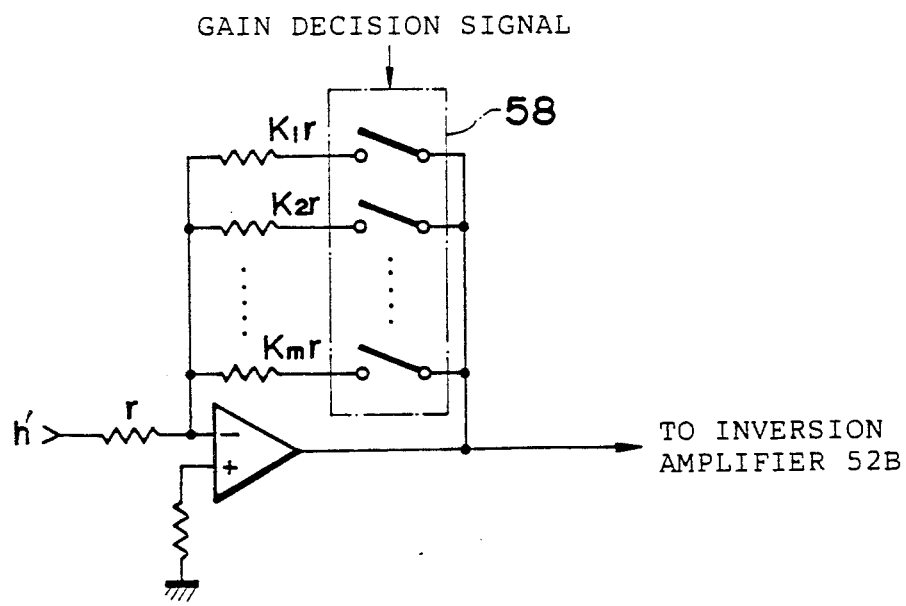
FIG. 25 is a circuit diagram showing a variation example of the inversion amplifier of FIG. 24.

FIG. 25 shows an example of variation of the inversion amplifier 52A at the preceding stage. The feedback resistor circuit of the operational amplifier includes m resistors $K_{1r}, K_{2r}, \ldots, K_{mr}$ connected in parallel and an analog multiplexer 58 for selecting either one of these resistors in response to a gain decision signal supplied thereto. When a gain decision signal is inputted to the analog multiplexer 58, one of the registers is selected depending on an indication content of the signal so as to vary the amplification factor K of the amplifier 52.

As described above, it is possible to multiply the output from the logic intersection circuit 104 by a coefficient. In consequence, depending on the degree of importance of a rule or the like, the fuzzy inference engine can be arbitrarily adjusted, thereby improving the degree of freedom of adjustment.

It goes without saying that the seventh invention can also be materialized by use of a software system.

In accordance with the eighth invention, the MFCs 101 to 103 of the antecedent and the MFGs 105 of the consequent are respectively housed in detachable cartridges, which are to be installed in the body of the fuzzy inference engine.

Figure 26:
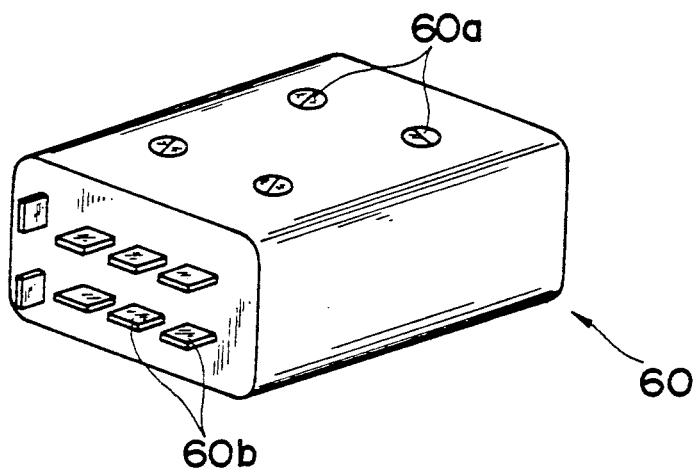
FIG. 26 is a perspective view showing an appearance of a membership function circuit cartridge according to an eighth embodiment of the present invention.

FIG. 26 shows a external appearance of an MFC cartridge 60, which comprises eight plugs 60b serving as terminals respectively associated with input/output signals and power supply voltage. The body of the fuzzy inference engine includes sockets corresponding to the plugs 60b. On the upper surface of the cartridge 60, there are disposed four trimmers 60a related to variable registers $r_{E1}$, $r_{B1}$, $r_{E2}$, and $r_{B2}$ (refer to FIG. 7 for details). By turning these trimmers by means of a screwdriver, the associated resistance values can be altered to change the shape and position of membership functions. When the adjustment is beforehand achieved by use of the trimmers 60a, the membership functions can be set only by installing the cartridges 60 into the sockets. The MFG cartridges are also configured in the same fashion.

If the MFC arrays 11 to 13 and the MFG array 15 of FIG. 4, the MFC arrays 11A to 13B and MFG arrays 15A and 15B of FIG. 14, and all MFCs and MFGs included in these arrays are designed to be detachably installed in the fuzzy inference engine by means of the plugs and sockets, the replacement of arrays as well as switching thereof are facilitated.

In addition, the MFCs 101A to 103B and MFGs 105A and 105B of FIG. 11 need only be housed in the respective cartridges to be detachably inserted into sockets.

Figure 27:
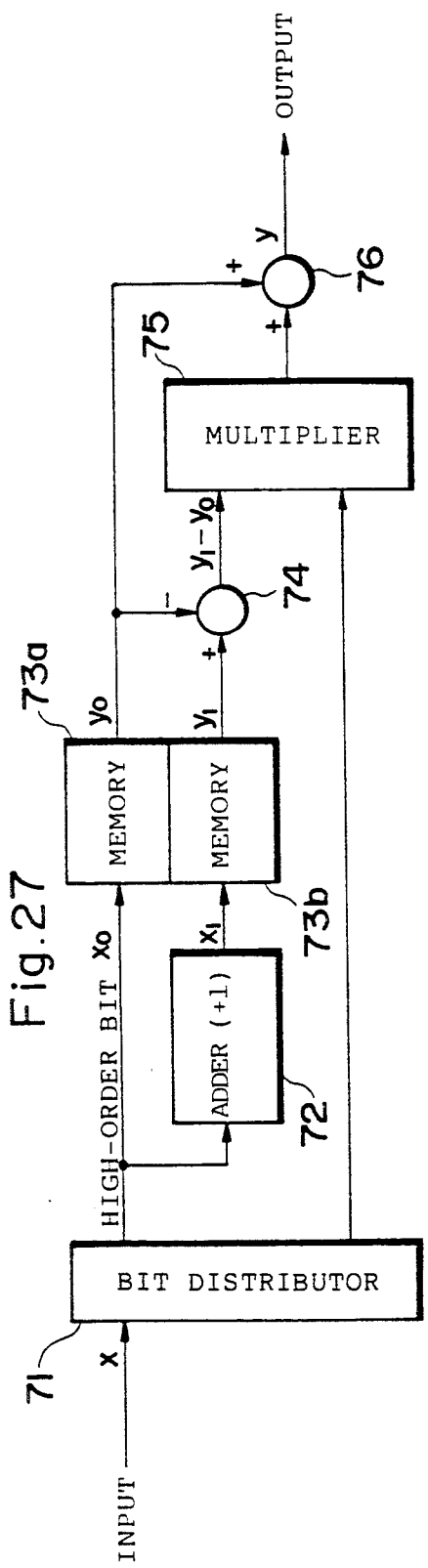
FIG. 27 is a schematic block diagram showing a function generating arithmetic unit as a ninth embodiment according to the present invention.
Figure 28:
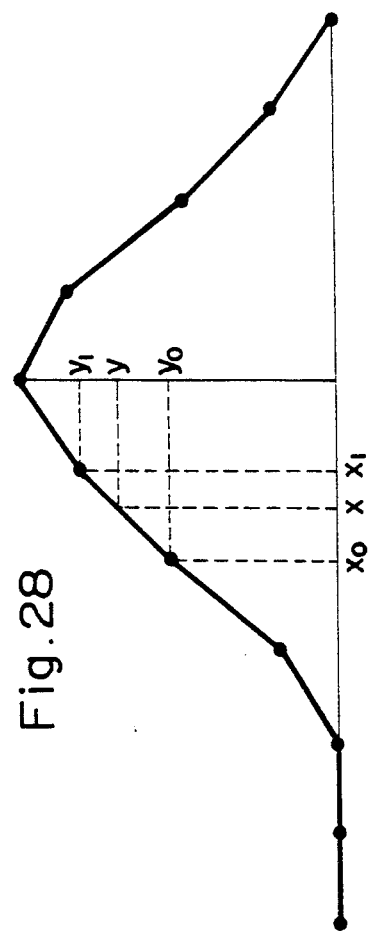
FIG. 28 is a graph for explaining the function of the function generating unit.

FIG. 27 is a block diagram showing a function generating unit as an embodiment according to the ninth embodiment, whereas FIG. 28 is a graph useful to explain a function generated by the function generating unit of FIG. 27. Variable values are supplied in a form of 8-bit data (x) to this unit. The 8-bit data (x) is subdivided by a bit distributor 71 into four high-order bits ($x_0$) and four low-order bits (x). The value of four high-order bits ($x_0$) is supplied as an address signal to a memory 73a and to an adder 72, which adds one to the received value. The adder 72 delivers the resultant value to a memory 73b. In the memories 73a and 73b, the same data are respectively stored at the same associated addresses with a fixed plotting interval (dots shown in FIG. 28 indicate plotted positions and are stored in the memory.) From the memory 73a, the system reads out an output ($y_0$) by use of an address $x_0$ so as to supply the output ($x_0$) to adders 74 and 76. In the adder 74, the value is processed as a negative value ($-y_0$), namely, a substraction is actually conducted. The adder 74 is also provided with an output ($y_1$) from the memory 73b. In consequence, the adder 74 produces a difference ($y_1 - y_0$) between the outputs from the memories 73b and 73a, respectively. The resultant value is fed to a multiplier 75, which multiplies the value ($y_1 - y_0$) by the value of the four inputted low-order bits (x/16) to output the result to the adder 76. In the adder 76, the multiplication result is added to the output $y_0$ from the memory 73a to produce the result as a function value y.

Incidentally, in the memories 73a and 73b, if the same data items are stored at addresses having difference of one address unit there between (i.e. at an address where data $x_0$ is stored in the memory 73a, data $x_1$ is stored in the memory 73b), the adder 72 is unnecessitated. Furthermore, in a case where the operation speed is not critical, it is possible to employ only one memory so as to sequentially read out $x_0$ and $x_1$ therefrom.

In this embodiment, the description has been given of a membership function circuit of a fuzzy inference engine. However, the invention described above is also applicable to apparatuses such as a standard pattern storage of a pattern identifier.

While the particular embodiment of the invention has been shown and described, it will be obvious to those skilled in the art that various changes and modifications may be made without departing from the present invention in its broader aspects.

What is claimed is:

1. A fuzzy inference engine comprising:
   a plurality of membership function circuit arrays corresponding to a number of kinds of input variables to be processed;
   a membership function generator circuit array;
   a plurality of individual inference sections; and
   a concluder section for processing outputs from said individual inference sections so as to produce a final inference output,
   each said membership function circuit array including a number of membership function circuits,
   said membership function generator circuit array comprising a number of membership function generator circuits,
   each said inference section including:
      first selector circuits each for conducting, for each input variable kind, a selection on membership function values outputted from said membership function circuit arrays so as to select one of said function values according to a preset rule,
      a second selector circuit for conducting a selection on membership functions outputted from said membership function generator circuit arrays so as to select one of said functions according to a preset rule, and
      an operation circuit for achieving a predetermined fuzzy operation on outputs from said first and second selector circuits.

2. A fuzzy inference engine according to claim 1, wherein said membership function circuit arrays include membership function circuits of a number corresponding to a number of kinds of linguistic information items.

3. A fuzzy inference engine according to claim 2, wherein each of said first selector circuits, provided with a first linguistic information item, selects a membership value outputted from a membership function circuit array according to a preset rule.

4. A fuzzy inference engine according to claim 1, wherein said membership function generator circuit array comprises seven membership function generator circuits.

5. A fuzzy inference engine according to claim 4, wherein said second selector circuit selects a membership function outputted from said membership function generator circuit arrays according to a second linguistic information item provided to said second select circuit.

6. A fuzzy inference engine comprising:
   membership function circuit sets including membership function circuits of a number corresponding to a number of inference systems;
   a membership function generator circuit set including membership function generator circuits of a number corresponding to the number of inference systems;
   a plurality of first select means each responsive to a variable selection input for selecting one of said membership function circuits associated therewith from a membership function circuit set;
   second select means responsive to a variable selection input for selecting one of said membership function generator circuits associated therewith from the membership function generator circuit set; and
   fuzzy operation circuit for achieving an operation on outputs respectively from the selected membership function circuit and the selected membership function generator circuit.

7. A fuzzy inference engine comprising:
   membership function circuit array sets including membership function circuit arrays of a number corresponding to a number of inference systems, each said array comprising a number of membership function circuits;
   a membership function generator circuit array set including membership function generator circuit arrays of a number corresponding to a number of inference systems, each said array comprising a number of membership function generator circuits;
   a plurality of first select means each responsive to a variable selection input for selecting one of said membership function circuit arrays associated therewith from a membership function circuit array set;
   second select means responsive to a variable selection input for selecting one of said membership function generator circuit arrays associated therewith from the membership function generator circuit array set;
   third select means each for effecting a selection on membership function values outputted from said membership function circuit array selected by said first select means one of said values according to a preset rule;
   fourth select means for achieving a selection on membership functions outputted from said membership function generator circuit array selected by a said second select means one of said functions according to a preset rule; and
   an operation circuit for achieving predetermined fuzzy operation on outputs respectively supplied from said third and fourth select means.

8. A fuzzy inference engine according to claim 7, wherein each of said membership function circuit arrays includes membership function circuits of a number corresponding to a number of kinds of linguistic information items.

9. A fuzzy inference engine according to claim 7, wherein each of said third select means, provided with a first linguistic information item, delivers membership function values provided from a first select means to the operation circuit according to the first linguistic information items.

10. A fuzzy reference engine according to claim 7, wherein each of said membership function generator circuit arrays comprises seven membership function generator circuits.

11. A fuzzy inference engine according to claim 10, wherein said fourth select means selects a membership function outputted from said membership function generator circuit arrays according to a second linguistic information item provided to said fourth select means.

* * * * *